(12) United States Patent
Easton et al.

(10) Patent No.: US 11,824,207 B2
(45) Date of Patent: Nov. 21, 2023

(54) CONDUCTIVE DOPED METAL OXIDE CATALYST/CATALYST SUPPORTS

(71) Applicant: University of Ontario Institute of Technology, Oshawa (CA)

(72) Inventors: E. Bradley Easton, Oshawa (CA); Reza Alipour Moghadam Esfahani, Oshawa (CA)

(73) Assignee: University of Ontario Institute of Technology, Oshawa (CA)

( * ) Notice: Subject to any disclaimer, the term of this patent is extended or adjusted under 35 U.S.C. 154(b) by 0 days.

(21) Appl. No.: 17/317,361

(22) Filed: May 11, 2021

(65) Prior Publication Data
US 2021/0351415 A1 Nov. 11, 2021

Related U.S. Application Data

(60) Provisional application No. 63/023,563, filed on May 12, 2020, provisional application No. 63/023,032, filed on May 11, 2020.

(51) Int. Cl.
| | |
|---|---|
| *H01M 4/90* | (2006.01) |
| *H01M 4/92* | (2006.01) |
| *H01M 4/88* | (2006.01) |

(52) U.S. Cl.
CPC ....... *H01M 4/9016* (2013.01); *H01M 4/8882* (2013.01); *H01M 4/921* (2013.01); *H01M 4/926* (2013.01)

(58) Field of Classification Search
CPC ...... H01M 4/921; H01M 4/925; H01M 4/926; H01M 4/8652; H01M 4/8882; H01M 4/9016; H01M 2008/1095; Y02E 60/50
See application file for complete search history.

(56) References Cited

U.S. PATENT DOCUMENTS

| | | | |
|---|---|---|---|
| 2015/0372316 A1* | 12/2015 | Hayden | H01M 4/925 502/439 |
| 2020/0112032 A1 | 4/2020 | Moghadam Esfahani et al. | |
| 2021/0066724 A1* | 3/2021 | Steinbach | H01M 4/8657 |

OTHER PUBLICATIONS

Ishihara, Akimitsu, et al. "Progress in non-precious metal oxide-based cathode for polymer electrolyte fuel cells." Electrochimica Acta 55.27 (2010): 8005-8012 (Year: 2010).*
Munir, Shamsa, Syed Mujtaba Shah, and Hazrat Hussain. "Effect of carrier concentration on the optical band gap of TiO2 nanoparticles." Materials & Design 92 (2016): 64-72 (Year: 2016).*
Pan, Chun-Jern, et al. "Tuning/exploiting strong metal-support interaction (SMSI) in heterogeneous catalysis." Journal of the Taiwan Institute of Chemical Engineers 74 (2017): 154-186 (Year: 2017).*

(Continued)

*Primary Examiner* — William E McClain
*Assistant Examiner* — Jared Hansen
(74) *Attorney, Agent, or Firm* — Bereskin & Parr LLP

(57) ABSTRACT

Fuel cell electrocatalysts and support structures thereof are described herein. The support structures include a suboxide core comprising an oxygen deficient metal oxide and a dopant, and an outer shell covering the suboxide core. The outer shell comprises the dopant in oxide form. The dopant of the suboxide core provides for the suboxide core to be conductive. Methods of forming fuel cell electrocatalysts and support structures thereof are also described herein.

6 Claims, 29 Drawing Sheets

(56) References Cited

OTHER PUBLICATIONS

Esfahani, Reza Alipour Moghadam, et al. "A fuel cell catalyst support based on doped titanium suboxides with enhanced conductivity, durability and fuel cell performance." Journal of Materials Chemistry A 6.30 (2018): 14805-14815 (Year: 2018).*

Raguram, T., and K. S. Rajni. "Synthesis and analysing the structural, optical, morphological, photocatalytic and magnetic properties of TiO2 and doped (Ni and Cu) TiO2 nanoparticles by sol-gel technique." Applied Physics A 125.5 (2019): 1-11. (Year: 2019).*

Gao, Wenliang, et al. "Titania-supported bimetallic catalysts for photocatalytic reduction of nitrate." Catalysis today 90.3-4 (2004): 331-336 (Year: 2004).*

Sasaki, K., L. Zhang, and R. R. Adzic. "Niobium oxide-supported platinum ultra-low amount electrocatalysts for oxygen reduction." Physical Chemistry Chemical Physics 10.1 (2008): 159-167 (Year: 2008).*

Wang, Yan-Jie, et al. "Ta and Nb co-doped TiO2 and its carbon-hybrid materials for supporting Pt—Pd alloy electrocatalysts for PEM fuel cell oxygen reduction reaction." Journal of Materials Chemistry A 2.32 (2014): 12681-12685 (Year: 2014).*

Zhai, Ximei, et al. "Oxygen vacancy boosted the electrochemistry performance of Ti4+ doped Nb2O5 toward lithium ion battery." Applied Surface Science 499 (2020): 143905 (Year: 2019).*

Odetola et al., "Enhanced activity and stability of Pt/TiO2/carbon fuel cell electrocatalyst prepared using a glucose modifier", J. Power Sources, 294 (2015) 254-263.

Esfahani et al., "Stable and methanol tolerant Pt/TiOx—C electrocatalysts for the oxygen reduction reaction", Int. J. Hydrogen Energy, 40 (2015) 14529-14539.

Zhang et al., "An overview of metal oxide materials as electrocatalysts and supports for polymer electrolyte fuel cells", Energy Environ. Sci., 7 (2014) 2535-2558.

Esfahani et al., "Innovative carbon-free low content Pt catalyst supported on Mo-doped titanium suboxide (Ti 3 O 5—Mo) for stable and durable oxygen reduction reaction", Appl. Catal., B, 201 (2017) 419-429.

Esfahani et al., "A fuel cell catalyst support based on doped titanium suboxides with enhanced conductivity, durability and fuel cell performance", J. Mater. Chem. A, 6 (2018) 14805-14815.

Esfahani et al., "Exceptionally durable Pt/TOMS catalysts for fuel cells", Appl. Catal., B, 268 (2020) 118743.

Esfahani et al., "A highly durable N-enriched titanium nanotube suboxide fuel cell catalyst support", Appl. Catal., B, 263 (2020) 118272.

Easton et al., "An electrochemical impedance spectroscopy study of fuel cell electrodes", Electrochim. Acta, 50 (2005) 2469-2474.

Saleh et al., "Diagnosing Degradation within PEM Fuel Cell Catalyst Layers Using Electrochemical Impedance Spectroscopy", J. Electrochem. Soc., 159 (2012) B546-B553.

Reid et al., "Application of the Transmission Line EIS Model to Fuel Cell Catalyst Layer Durability", ECS Trans., 61 (23) (2014) 25-32.

Shi et al., "Intermetallic Pd3Pb nanowire networks boost ethanol oxidation and oxygen reduction reactions with significantly improved methanol tolerance", J. Mater. Chem. A, 5 (2017) 23952-23959.

Barkholtz et al., "Advancements in rationally designed PGM-free fuel cell catalysts derived from metal-organic frameworks", Materials Horizons, 4 (2017) 20-37.

Ge et al., "High activity electrocatalysts from metal-organic framework-carbon nanotube templates for the oxygen reduction reaction", Carbon, 82 (2015) 417-424.

Kartachova et al., "Bimetallic molybdenum tungsten oxynitride: structure and electrochemical properties", J. Mater. Chem. A, 1 (2013).

Sfahani et al., "A hydrothermal approach to access active and durable sulfonated silica-ceramic carbon electrodes for PEM fuel cell applications", Appl. Catal., B, 239 (2018) 125-132.

Moosavifard et al., "Designing 3D highly ordered nanoporous CuO electrodes for high-performance asymmetric supercapacitors", ACS Appl Mater Interfaces, 7 (2015) 4851-4860.

Xia et al., "Enhanced electrochemical activity of perforated graphene in nickel oxide-based supercapacitors and fabrication of potential asymmetric supercapacitors", Sustainable Energy & Fuels, 1 (2017) 529-539.

Easton et al., "Probing the degradation of carbon black electrodes in the presence of chloride by electrochemical impedance spectroscopy", Carbon, 162 (2020) 502-509.

Mohamed et al., "Photoelectrochemical behavior of bimetallic Cu—Ni and monometallic Cu, Ni doped TiO2 for hydrogen production", International Journal of Hydrogen Energy, 40 (2015), 14031-14038.

Azad et al., "Solid-State Gas Sensors—a Review", J. Electrochem. Soc., 139 (1992) 3690-3704.

Morin et al., "Evaluation of the effect of two-dimensional geometry of Pt single-crystal faces on the kinetics of upd of H using impedance spectroscopy", J. Electroanal. Chem., 412 (1996) 39-52.

Beghi, "A decade of research on thermochemical hydrogen at the Joint Research Centre", Ispra, Int. J. Hydrogen Energy, 11 (1986) 761-771.

* cited by examiner

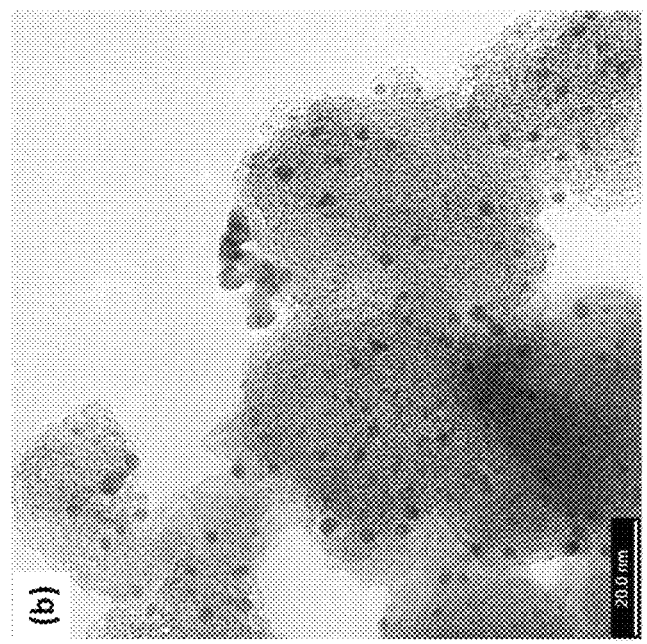
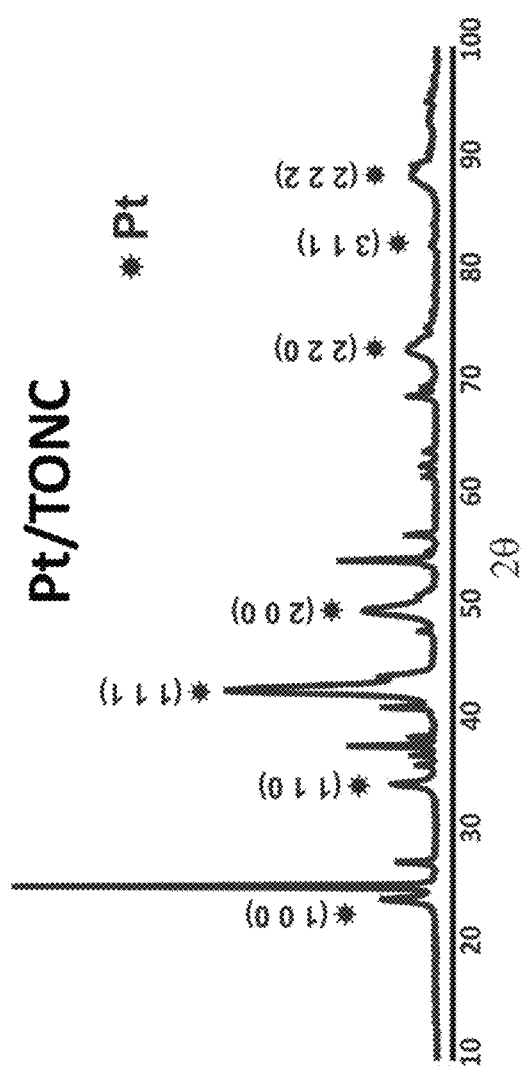
FIG. 9B
FIG. 9A

CONDUCTIVE DOPED METAL OXIDE CATALYST/CATALYST SUPPORTS

CROSS-REFERENCE

The present application claims the benefit of United States Provisional Patent Application No. 63/023,032, entitled Conductive Doped Metal Oxide Catalyst/Catalyst Supports, filed on May 11, 2020 and the benefit of U.S. Provisional Patent Application No. 63/023,563 entitled Conductive Doped Metal Oxide Catalyst/Catalyst Supports filed on May 12, 2020, the contents of each of which are incorporated herein by reference.

FIELD

This disclosure relates generally to fuel cell electrocatalysts, and more specifically to conductive doped metal oxide catalysts and catalyst supports.

BACKGROUND

Current state-of-the-art polymer electrolyte membrane fuel cell (PEMFC) technologies rely heavily on platinum (Pt) electrocatalysts to drive the anodic and cathodic reactions of the fuel cell. Normally, Pt nanoparticles are dispersed onto a high surface carbon support (Pt/C) to maximize the surface area of the catalyst and increase cell performance. Carbon black has been the de facto catalyst support in fuel cell over the last 30 years due to its high surface area and electrical conductivity. However, carbon is a liability when it comes to durability since it is prone to corrosion under the highly acidic and oxidative real-world operating conditions of a PEM fuel cell. Carbon corrosion is detrimental to the long-term performance of a fuel cell and eventually leads to catastrophic performance losses. Furthermore, even when carbon corrosion does not occur, Pt aggregation occurs readily on carbon, which decreases the electrochemically active surface area (ECSA) of the catalyst, and subsequently the performance of the electrode. A common approach to mitigate the rate of degradation is to modify the support with a metal oxide. For example, carbon modified with $TiO_2$ has been shown to slow the rate of Pt dissolution/agglomeration [1, 2].

There is a great desire to replace the carbon support in its entirety with a corrosion resistant support. While many metal oxides meet the low corrosion requirements, most metal oxides suffer from poor electronic conductivity [3], which limits their practical use in fuel cell devices.

Accordingly, there is a need for improved systems, devices and methods for PEMFC technologies, and specifically for improved catalysts and catalyst support structures for PEMFC technologies.

SUMMARY

In accordance with a broad aspect, there is provided, a fuel cell electrocatalyst support structure comprising: a suboxide core comprising an oxygen deficient metal oxide and a dopant; and an outer shell covering the suboxide core, the outer shell comprising the dopant in oxide form. The dopant of the suboxide core provides for the suboxide core to be conductive.

In accordance with a broad aspect, there is provided a fuel cell electrocatalyst comprising: a support structure including: a suboxide core comprising an oxygen deficient metal oxide and a dopant; and an outer shell covering the suboxide core. The outer shell comprises the dopant in oxide form. The dopant of the suboxide core provides for the suboxide core to be conductive.

In at least one embodiment, the suboxide core comprises one of $TiO_2$, $Nb_2O_5$ and $Ta_2O_5$.

In at least one embodiment, the dopant in oxide form comprises a metal or a metalloid.

In at least one embodiment, the dopant in oxide form comprises a metalloid.

In at least one embodiment, the dopant in oxide form comprises one or more of silicon (Si), copper (Cu), nickel (Ni), titanium (Ti), niobium (Nb), tantalum (Ta), iron (Fe), cobalt (Co), molybdenum (Mo), boron (B), indium (In), antimony (Sb), germanium (Ge), tin (Sn), gallium (Ga) and tungsten (W).

In at least one embodiment, the suboxide core comprises one of $TiO_2$ and the dopant in oxide form comprises one or more of Si, Cu, Ni, Ti, Nb, Ta, Fe and Co.

In at least one embodiment, the suboxide core comprises one of $Nb_2O_5$ and $Ta_2O_5$, and the dopant in oxide form comprises one or more of Mo, Si, Cu, Ni, Ti, Nb, Ta, Fe and Co.

In at least one embodiment, the suboxide core comprises $Ti_3O_5$ and the dopant in oxide form comprises $SiO_2$.

In at least one embodiment, the suboxide core comprises $TiO_2$ and the dopant in oxide form comprises Cu and Ni.

In at least one embodiment, the suboxide core comprises $Nb_2O_5$ and the dopant in oxide form comprises Si.

In at least one embodiment, the support structure has a band gap that is less than 1 eV.

In at least one embodiment, the support structure has a band gap that is in a range of about 0.3 to about 0.5 eV.

In accordance with a broad aspect, there is provided a method of forming a fuel cell electrocatalyst support structure. The method includes mixing a core metal oxide material with one or more dopant precursors to form a resulting mixture; and heating the resulting mixture in a reducing environment to form the fuel cell electrocatalyst support structure. The core metal oxide material is one of $TiO_2$, $Nb_2O_5$ and $Ta_2O_5$. The dopant precursor comprises a metal or a metalloid.

In accordance with a broad aspect, there is provided a method of forming a fuel cell electrocatalyst. The method includes mixing a core metal oxide material with one or more dopant precursors to form a resulting mixture; heating the resulting mixture in a reducing environment to form the fuel cell electrocatalyst support structure; and depositing catalytic nanoparticles onto a surface of the fuel cell electrocatalyst support structure. The core metal oxide material is one of $TiO_2$, $Nb_2O_5$ and $Ta_2O_5$ and the dopant precursor comprises a metal or a metalloid.

In at least one embodiment, the dopant precursor comprises one or more of Si, Cu, Ni, Ti, Nb, Ta, Fe, Co, Mo, B, In, Sb, Ge, Sn, Ga and W.

In at least one embodiment, the core metal oxide material is $TiO_2$ and the dopant precursor is one or more of Si, Cu, Ni, Ti, Nb, Ta, Fe and Co.

In at least one embodiment, the core metal oxide material is one of $Nb_2O_5$ and $Ta_2O_5$ and the dopant precursor is one or more of Mo, Si, Cu, Ni, Ti, Nb, Ta, Fe and Co.

In at least one embodiment, the core metal oxide material is $Ti_3O_5$ and the dopant precursor is Si.

In at least one embodiment, the core metal oxide material is $TiO_2$ and the dopant precursor is Cu and Ni.

In at least one embodiment, the core metal oxide material is $Nb_2O_5$ and the dopant precursor is Si.

In at least one embodiment, the catalytic nanoparticles comprise platinum or a platinum alloy.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 9A shows an X-Ray Diffraction (XRD) pattern of Pt/TONC.

FIG. 9B shows a TEM image of Pt/TONC.

Figure 1:
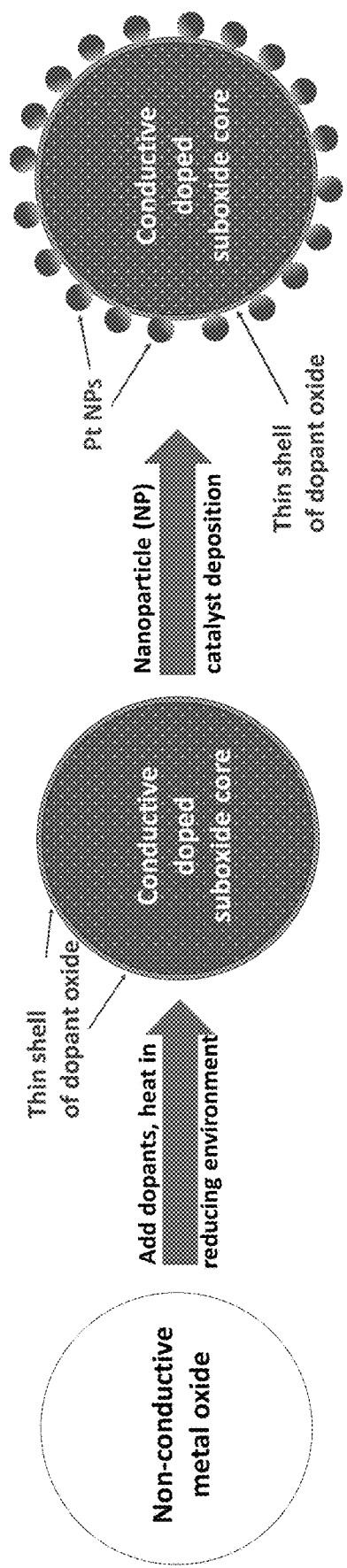
FIG. 1 shows a schematic diagram showing the synthesis process of doped metal oxide supports in accordance with the teachings herein, according to one example embodiment.

Further aspects and features of the example embodiments described herein will appear from the following description taken together with the accompanying drawings.

DESCRIPTION OF EXAMPLE EMBODIMENTS

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new technologies that use non-conductive metal oxides that can be used in a practical catalyst support. For example, "sub-oxides" like $Ti_3O_5$ have attracted interest, but these also tend to be combined with carbon to achieve suitable conductivity [2]. Recently, it has been shown that doping $Ti_3O_5$ with Mo (hereafter referred to as TOM) leads to the formation of a catalyst support with acceptable conductivity. Pt/TOM catalysts have been shown to have improved oxygen reduction activity and durability compared to Pt/C [4].

While the performance of Pt/TOM catalysts was found to be good, the TOM catalyst support has a band gap of 2.6 eV, meaning it is still a semi-conductor but does not have the desired level of electronic conduction needed for practical PEM fuel cells. Previous studies created a new material doped with both Mo and Si, $Ti_3O_5$—Mo—Si (hereafter referred to as TOMS) support [5, 6]. Remarkably, this support has a band gap of only 0.31 eV, approaching the conductivity of a metal.

While TOMS catalyst supports have been shown to not be as susceptible to corrosion under fuel cell operating conditions as other support materials, there is some concern that Mo may leach from the system during prolonged activity. Furthermore, other metal oxide/dopant systems may yield better performance and durability. As such, new doped metal oxide compositions that would serve as electrocatalyst supports for a variety of fuel cell relevant reactions are desired.

Herein, a non-conductive, metal oxide material is prepared. In at least one embodiment, the material may be used as a catalyst support structure in, for example electrochemical devices. It should be understood though that, given their unique properties, these materials may be useful for a wide range of other electrochemical reactions and devices including but not limited to direct fuel cells, electrolyzers, and sensor devices like breathalyzers.

The process of forming the materials described here, and specifically the catalyst support structures, involves the use of sequential doping of one or more different elements to create oxygen vacancies within the lattice of the non-conductive, metal oxide. The resulting conductive, doped suboxide core generally has a substantially lower band gap, which may be lower than that which is possible by doping with just a single element, rendering it suitable for use in electrochemical devices. In one aspect, deposition of catalyst nanoparticles (e.g. Pt) onto the surface of the catalyst support structure creates a material that may be suitable for use in PEM fuel cells. Electrochemical testing revealed that the catalyst support structure has high activity and performance in a PEM fuel cell. Furthermore, accelerated stress testing demonstrated that the dual-doped suboxide catalyst support structure is stable and durable under the harsh operating condition of PEM fuel cells.

In at least one aspect, the non-conductive, metal oxide core may be one of, but not limited to, $TiO_2$, $Nb_2O_5$ and $Ta_2O_5$, for example, in accordance with the teachings herein.

In at least one aspect, elements for use as dopants during doping of the non-conductive, core metal oxides described herein may include but are not limited to one or more elements considered to be metals or semi-metals (i.e. metalloids). In at least one aspect, the elements for use as dopants during doping of the non-conductive, core metal oxides described herein may include but are not limited to one or more of silicon (Si), copper (Cu), nickel (Ni), titanium (Ti), niobium (Nb), tantalum (Ta), iron (Fe), cobalt (Co), molybdenum (Mo), boron (B), indium (In), antimony (Sb), germanium (Ge), tin (Sn), gallium (Ga) and tungsten (W).

In at least one aspect, when the non-conductive, metal oxide core is $TiO_2$, the family of materials for doping the non-conductive, core metal oxide may include one or more of Si, Cu, Ni, Ti, Nb, Ta, Fe and Co. In at least one aspect, when the non-conductive, metal oxide core is $Nb_2O_5$ or $Ta_2O_5$, the family of materials for doping the non-conductive, core metal oxide may include one or more of Mo, Si, Cu, Ni, Ti, Nb, Ta, Fe and Co. This is summarized in Table 1.

TABLE 1

Summary of the combinations of core metal oxides and dopants reported in this work

| Core metal oxides | Doped with one or more of these dopants |
| --- | --- |
| $TiO_2$ | Si, Cu, Ni, Ti, Nb, Ta, Fe, Co |
| $Nb_2O_5$, $Ta_2O_5$ | Mo, Si, Cu, Ni, Ti, Nb, Ta, Fe, Co |

In at least one aspect, the resultant materials have a general structure that has an oxygen deficient core oxide that contains some dopant, along with an outer shell/coating that contains the dopant in oxide form. The dopant elements provided above generally all have an ability to create oxygen vacancies in the core oxide material and potential catalytic benefits in fuel cell devices. Generally, the resultant doped sub-oxide materials are highly conductive.

In at least one embodiment, one or more of the conductive doped suboxide cores described herein can be used with a metal catalyst in a fuel cell. For instance, the metal catalyst can be arranged on top of the conductive doped suboxide cores described herein. In at least one embodiment, the metal catalyst can be platinum or a platinum-based alloy.

EXAMPLES

Synthesis of Doped Metal Oxides

In at least one aspect, an example embodiment of a general synthetic procedure for making the conductive doped suboxide cores in accordance with the teachings described herein is shown in FIG. 1.

Briefly, one of the core metal oxide materials provided above was blended with the one or more dopant precursors. The resultant mixture was then heat-treated at elevated temperature in a reducing environment to form the new doped suboxide material. If desired, catalytic nanoparticles can be deposited onto the surface of the doped metal oxide material.

Generally, the suboxide supports were prepared by doping the commercially available metals oxide with 15-20 wt % of the dopant transition metals or metalloids. Initially, the transition metal/metalloid starting material was dispersed in a solution of acetonitrile, followed by the addition of 2 wt % Pluronic P123 surfactant, under $N_2$ purging. The mixture was sonicated and stirred for 2 h at ambient temperature after which the metal oxide was added to the mixture and continuously stirred at room temperature for another 5 h (under $N_2$) and then allowed to dry at 70° C. The obtained powder was subsequently heat-treated at 1000° C. for 4 h under a reducing atmosphere ($H_2:N_2$, 20:80 vol %).

Platinum (Pt) nanoparticles were deposited over the supports through a modified polyol method. 200 mg of metal suboxide support was added to a solution of ethylene glycol (EG) and 2-propanol (80:20 ml) and sonicated for 30 min followed by adding 5 wt % polyvinylpyrrolidone (PVP) to the solution and stirring for 2 h. The Pt precursor ($H_2PtCl_6 \cdot xH_2O$) was then dissolved in EG (20 ml), added to the solution containing metal suboxide support and left stirring for 3 h by controlling pH at 11 through adding 1 M KOH. The amount Pt precursor can be adjusted to select the desired wt % Pt in the final product. Here we show an example that employs 30 wt % Pt. The solution was purged with hydrogen for 30 min and then heated to 110° C. under a water-cooled reflux condenser for 5 h, after which it was cooled to room temperature. The pH of the solution was changed to adjust to pH 4 by dropwise addition of 1 M $HNO_3$, and left stirring for 12 h. The obtained solution was centrifuged, washed with ultrapure water, and subsequently dried at 80° C. The obtained catalyst was heat-treated at 400° C. for 3 h under a reducing atmosphere ($H_2:N_2$ 20:80 vol %).

Physical Characterization

Diffuse reflectance UV-vis spectral samples were recorded using a Perkin Elmer Lambda-750S UV/VIS spectrometer. The optical absorption spectra were used to determine the band gap of each sample by applying the Tauc equation. The electrical conductivity of the metal oxide powders were measured in the solid state via two-point probe measurements. Each powder was pelletized using a hydraulic press (25,000 pounds) resulting in a pellet with a diameter of 10 mm and a thickness of 1 mm. The pellet was placed between two copper probes with 9.3 mm cross section, and then the potential in the range of $0.1-1V_{RHE}$ was applied in order to measure current. Powder X-ray diffraction (XRD) patterns were obtained for samples using a Rigaku Ultima IV X-ray diffractometer system detector. This instrument employs Cu Kα radiation, (λ=0.15418 nm) operating at 40 kV and 44 mA. High resolution transmission electron microscopy (HRTEM) were performed with a JEOL 2010F field emission gun (FEG) operated at 200 kV, equipped with an Oxford Inca EDS system. Scanning Electron Microscopy (SEM) images were obtained using a Hitachi FlexSEM 1000 system equipped with an energy dispersive X-ray analyzer.

Electrochemical Characterization

The electrochemical evaluation was performed by ink deposition of samples onto the surface of either a glass carbon or a gold rotating disk electrode (Pine Instruments). Inks were prepared by dispersing each sample in a solution containing ultrapure water and isopropanol alcohol (50-50 vol %), followed by adding Nafion® at an ionomer-to catalyst ratio of 0.25. After mixing, 7 μL of ink was deposited onto the surface of electrode (0.196 cm$^2$) and allowed to dry under rotation (400 rpm) for 20 minutes. This ink-coated electrode served as the working electrode and was placed in a solution of either 0.1 M KOH, 0.5 M $H_2SO_4$, or 0.1 M $H_2SO_4$ along with either a saturated calomel electrode (SCE) or $Hg/HgSO_4$ reference electrode and a graphite rod as a counter electrode (each experiment repeated three times). All potentials reported here were corrected to the reversible hydrogen electrode (RHE) scale.

Electrochemical experiments were performed using either a Pine WaveDriver 20 bi-potentiostat or a Solartron 1470 multichannel potentiostat coupled to a Solartron 1260 Frequency response analyzer. Cyclic voltammetry (CV), electrochemical impedance spectroscopy (EIS), and accelerated stress tests (ASTs) were performed in $N_2$-sparged solutions. Impedance spectra were collected over a frequency range of 100 kHz to 0.1 Hz at a DC bias potential of either 0.8 or 0.425 $V_{RHE}$. Using these bias potentials allowed for the EIS data to be examined via the transmission line model so that the total catalyst layer resistance (RE) and the low-frequency limiting capacitance ($C_{dl}$) can be determined. These parameters have been proven to provide diagnostic information that can elucidate the degradation pathways [8-11]. The ORR activity was assessed using linear sweep voltammetry using a rotating disk electrode in $O_2$-saturated solution. The ex situ electrochemical stability of the catalysts was evaluated using ASTs that involved repeated cycling of the working electrode based on triangular-wave or rectangular-wave form at different potential ranges according to protocols recommended by the US Department of Energy. Details of the AST protocols that were used are summarized in Table 2.

TABLE 2

Summary of the accelerated stress testing (AST) protocols employed in this study.

| Protocol No. | Wave form | LPL*/$V_{RHE}$ | UPL*/$V_{RHE}$ | Sweep rate | Electrolyte | Temp. |
|---|---|---|---|---|---|---|
| AST-1 | triangular | 0.05 | 1.25 | 500 mV/s | 0.5M KOH | 25° C. |
| AST-2 | triangular | 0.05 | 1.25 | 500 mV/s | 0.5M $H_2SO_4$ | 25° C. |
| AST-3 | triangular | 1 | 1.5 | 500 mV/s | 0.1M $H_2SO_4$ | 25° C. |

*lower potential limit,
**upper potential limit

Example Composition 1: $TiONi_{0.15}Cu_{0.22}$ (TONC)

Synthesis of TONC

Commercial $TiO_2$ anatase was treated through the one step autoclave process in 8 M KOH at 150° C. for 24 h. TONC was prepared by doping the obtained surface-treated $TiO_2$ anatase with Cu and Ni. 15 wt % of Cu ($CuCl_2$) was dispersed in a solution of acetonitrile, followed by the addition of 2 wt % Pluronic P123 surfactant, under $N_2$ purging. The obtained solution was sonicated and stirred for 2 h at ambient temperature. Later $TiO_2$ was added to the solution and continuously stirred at room temperature for another 5 h under $N_2$ purging. Then 7 wt % Ni ($NiCl_2 \cdot xH_2O$) was added to the solution and sonicated for 1 h. The obtained solution stirred under $N_2$ purging for 24 h, and dried at 70° C. The obtained powder was heat-treated at 1000° C. (heating rate of 8° C. min$^{-1}$) for 4 h under a reducing atmosphere ($H_2:N_2$, 20:80 vol %).

Physical Characterization of TONC

Figure 2:
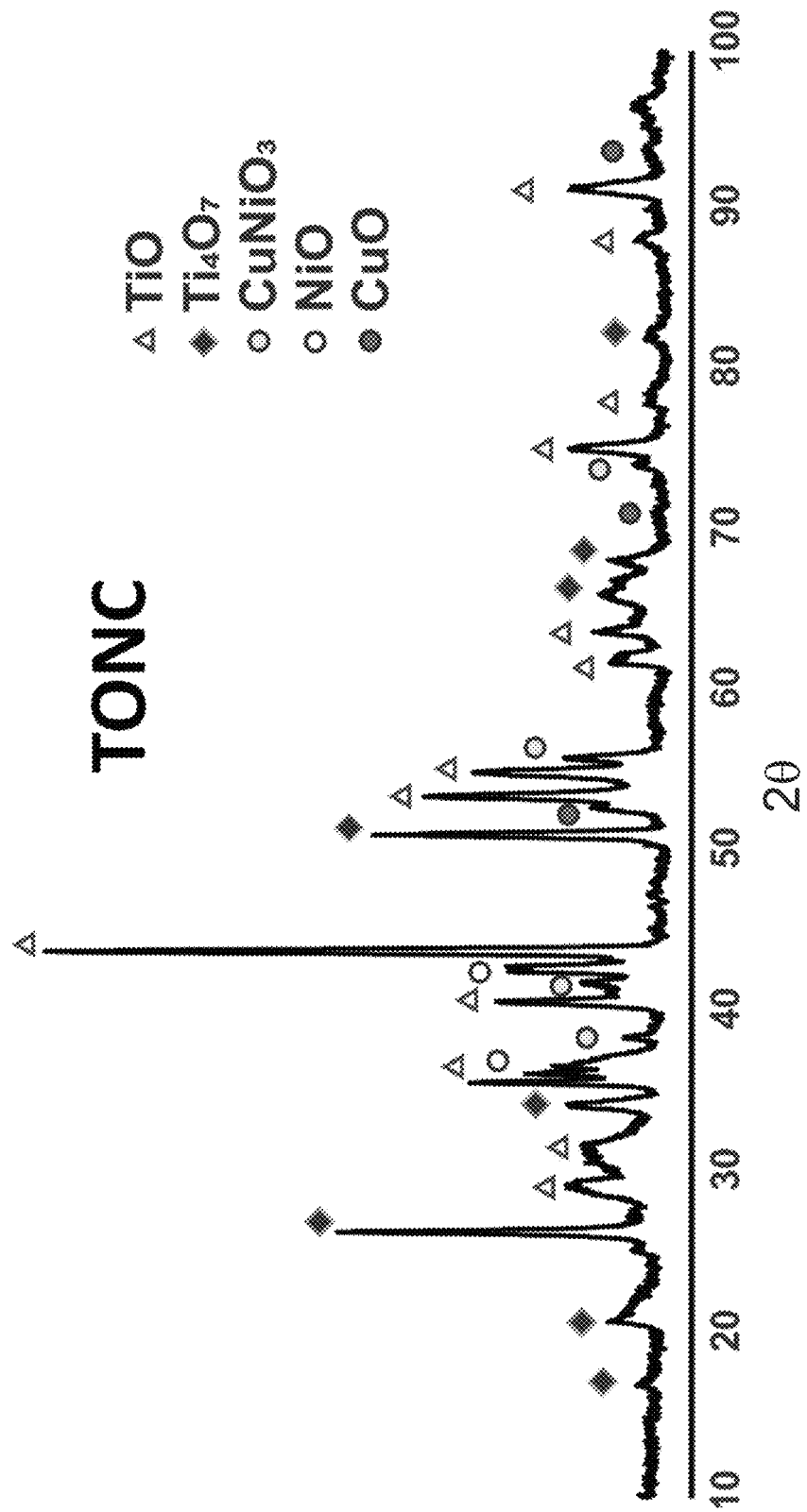
FIG. 2 shows a XRD pattern obtained for $TiONi_{0.15}Cu_{0.22}$ (TONC), according to one example embodiment.

The bandgap and electronic conductivity of TONC is listed in Table 3. The TONC material shows a low band gap and high conductivity, comparable to that of TOMS. X-ray diffraction analysis (FIG. 2) shows that the TONC material is an oxygen deficient lattice with Ti present primarily in the form of $Ti_4O_7$ (ICDD card no. 01-071-1428), with some TiO phase also present. Cu mostly is present as CuO (ICDD card no. 01-078-0428) and Ni is present as NiO (ICDD card no. 01-089-3080).

TABLE 3

Summary of the electronic bandgap and electrical conductivity of exemplar compositions compared to other metal oxide materials.

| | $TiO_2$ | $Nb_2O_5$ | $Ti_3O_5$-Mo [4] | TOMS [5] | TONC | TOS | NbOS |
|---|---|---|---|---|---|---|---|
| Band gap/eV | 3.35 | 3.6 | 2.6 | 0.35 | 0.3 | 0.47 | 0.5 |
| Conductivity (S cm$^{-1}$) | 1.4E-6 | — | 0.004 | 0.110 | 0.47 | 0.15 | 0.515 |

Figure 3A:
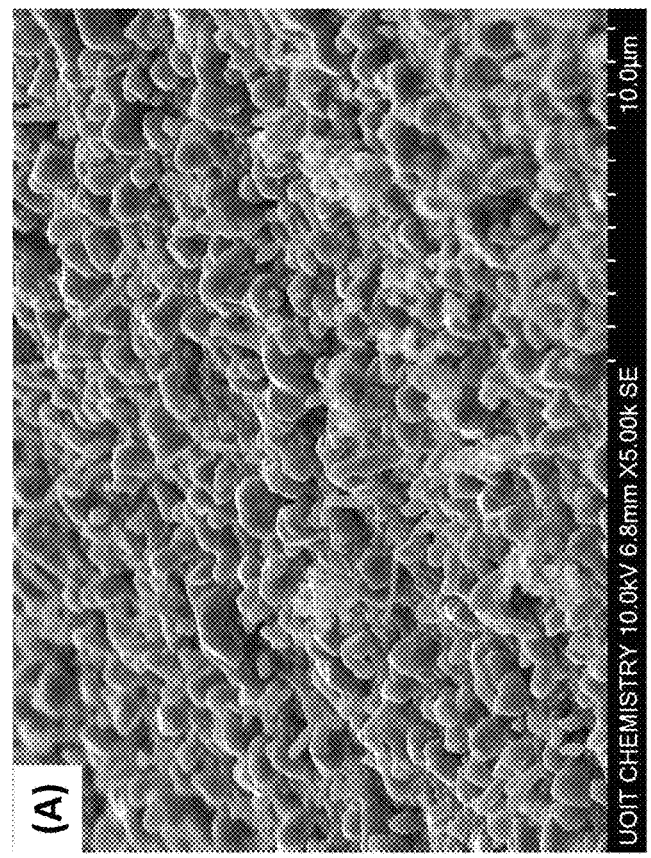
FIG. 3A shows a Scanning Electron Microscope (SEM) image obtained for TONC.
Figure 3B:
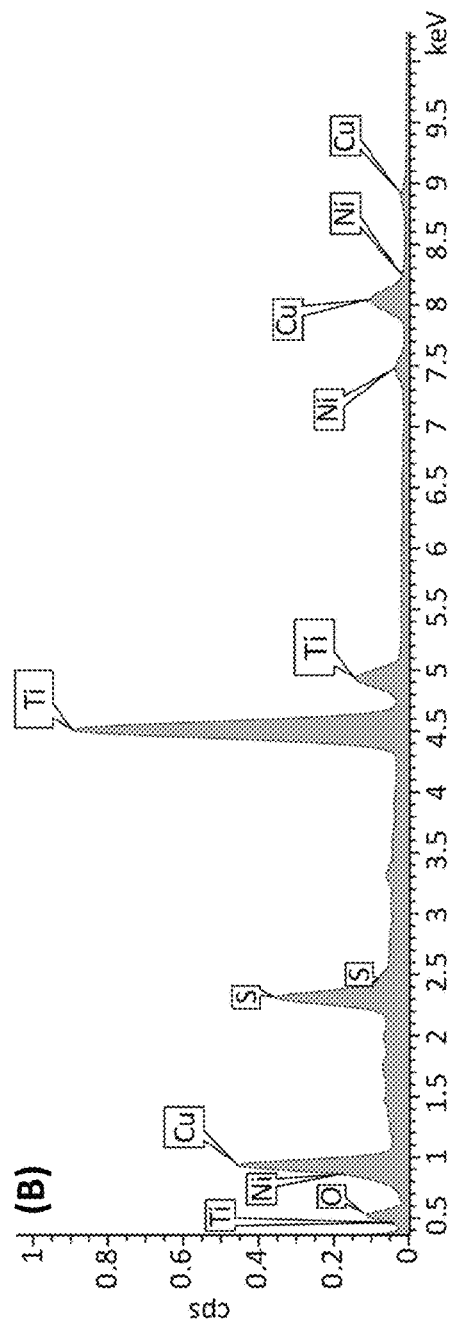
FIG. 3B shows an Energy Dispersive X-ray (EDX) spectra obtained for TONC.
Figures 4A, 4B, 4C:
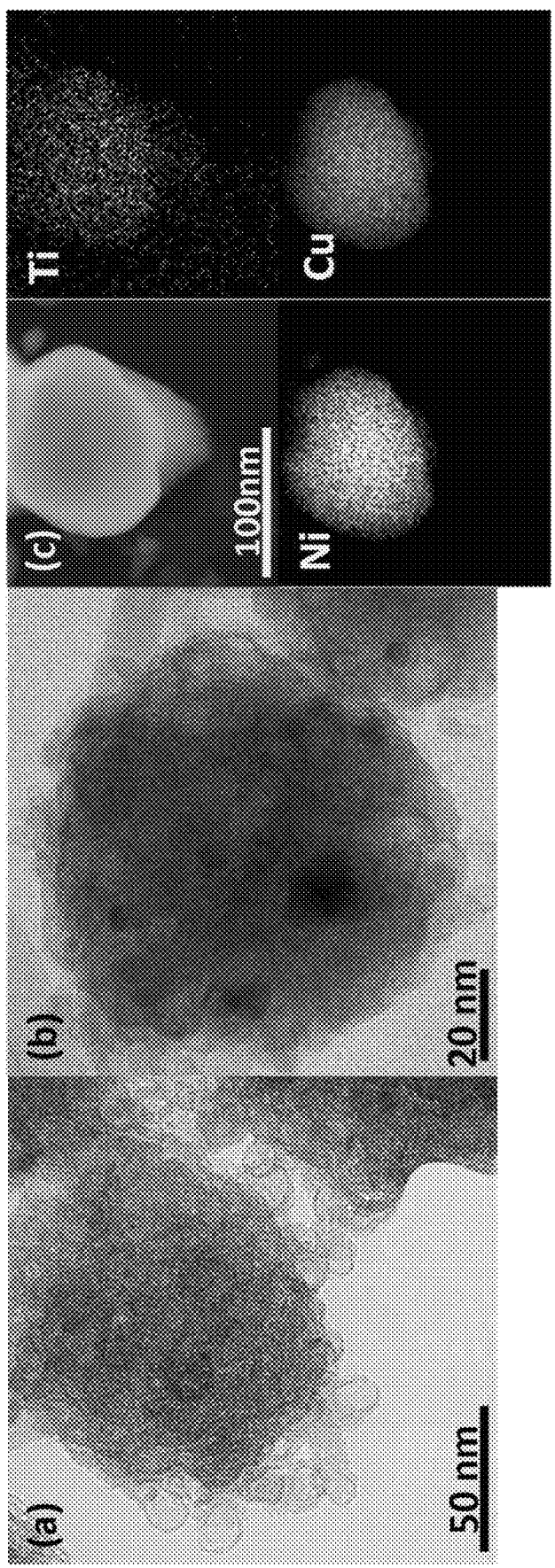
FIG. 4A shows a Transmission Electron Microscopy (TEM) analysis of TONC electrocatalyst where the scale shown indicates a length of 50 nm.
FIG. 4B shows a TEM analysis of TONC electrocatalyst where the scale shown indicates a length of 20 nm.
FIG. 4C shows a Scanning Transmission Electron Microscopy (STEM) elemental mapping of TONC.

FIGS. 3A and 3B show the scanning electron microscopy (SEM) image and energy dispersive X-ray (EDX) spectra, respectively, that were obtained for the TONC material. The material is spherical in nature and generally homogenous on the micro-scale. The EDX spectra confirms that Cu and Ni are present throughout the material. FIGS. 4A-4B show the Transmission Electron Microscopy (TEM) images obtained for the TONC material at different scales. This TONC material consists of nanoparticles with a diameter of 100±10 nm. In addition, there appears to be some nano-scale features (i.e. tube growth) on the particles. To investigate the compositional distribution, scanning transmission electron microscopy (STEM) mapping was performed on TONC and is shown in FIG. 4C. The presence of Cu and Ni dopant are clearly identifiable from STEM-mapping images, and they are evenly dispersed within the nanoparticles.

ORR Activity of TONC in Alkaline

Figures 5A, 5B:
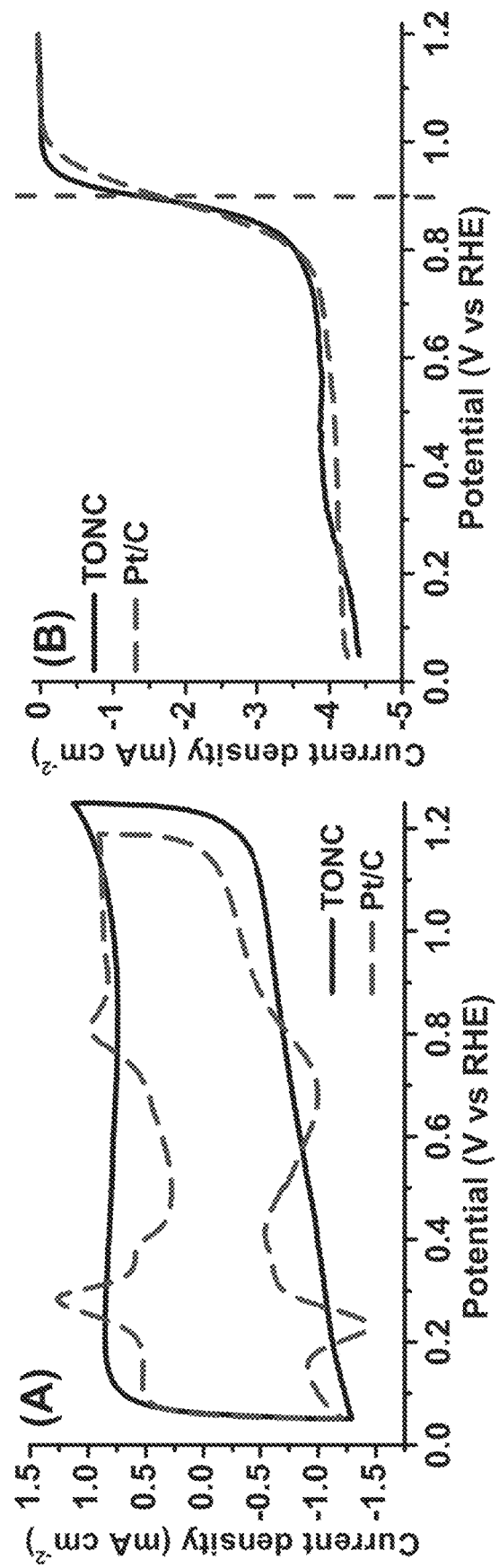
FIG. 5A shows comparisons of the Cyclic Voltammetry (CV) measurements obtained for TONC and Pt/C recorded in $N_2$-purged 0.1 M KOH and a scan rate of 20 $mV \cdot s^{-1}$.
FIG. 5B shows a comparison of the Oxygen Reduction Reaction (ORR) activity of TONC and Pt/C recorded in $O_2$-saturated 0.1 M KOH, at a scan rate of 5 $mV \cdot s^{-1}$ and 900 rpm.

FIG. 5A compares the CV measurements obtained for the TONC and the commercial Pt/C catalysts in alkaline media. The TONC electrocatalyst exhibited a rectangular shape with no identifiable redox peaks. The Pt/C electrocatalyst exhibit the classical Pt CV shape in alkaline media, which is a single anodic and cathodic peak with good reversibility in the hydrogen region at 0.25 $V_{RHE}$. [12]. FIG. 5B compares the ORR activity of TONC and commercial Pt/C catalysts. The TONC catalyst exhibited a high onset potential of 0.98 $V_{RHE}$ for $O_2$ reduction with a half-wave potential ($E_{1/2}$) of 0.88 $V_{RHE}$, showing excellent electroactivity as a carbon-free and platinum group metal (PGM)-free electrocatalyst, compared to commercial Pt/C with onset potential and $E_{1/2}$ of 1.03 and 0.88 $V_{RHE}$, respectively. Unlike many PGM-free electrocatalysts, TONC in one-step reaches to diffusion limited current density in catalyzing the ORR. The electroactivity of TONC is attributed to the constrained and sequential interaction between Ti suboxide and Cu—Ni dopants, which effectively facilitate the splitting 0-0 bond and promotes the direct 4-electron transfer ORR.

Durability of TONC in Alkaline

Most PGM-free catalysts have low durability. In order to better understand the durability of TONC catalyst, the TONC was subjected to three aggressive accelerated stress test (AST) protocols that mimic certain fuel cell operating conditions, including load cycling and startup/shut down conditions [7].

Figures 6A, 6B:
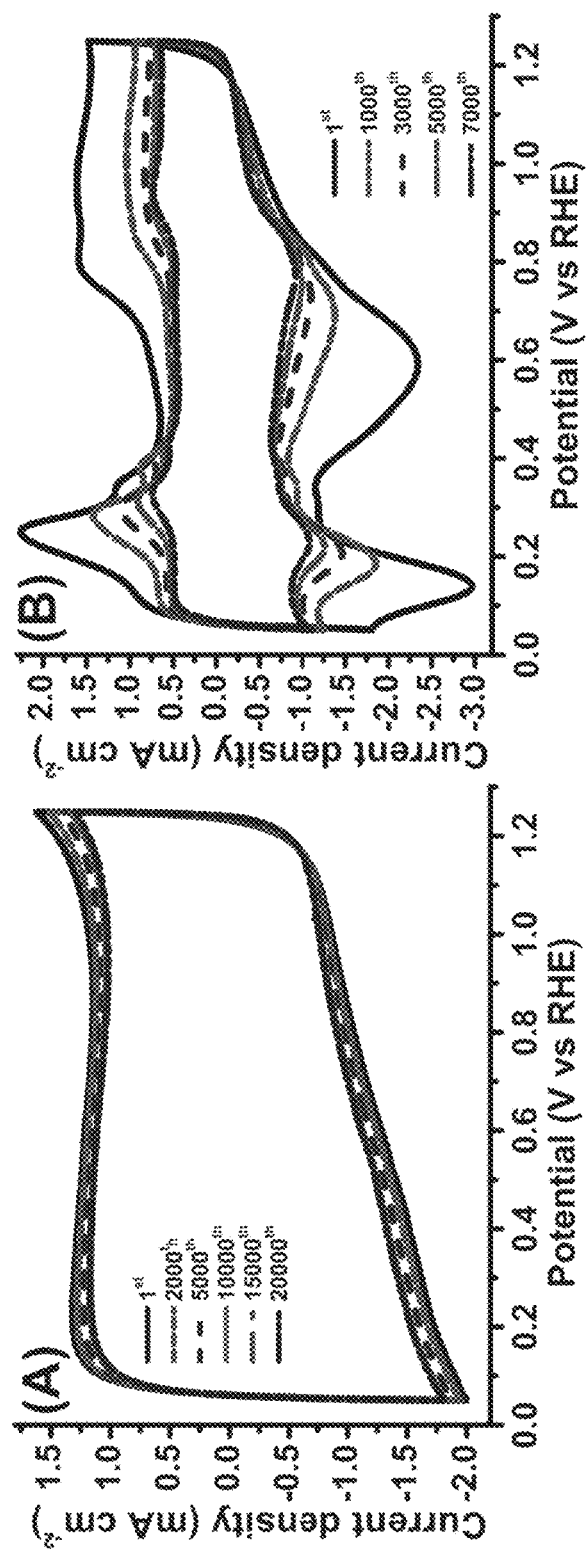
FIG. 6A shows a variation in the CV measurements obtained at different points in Accelerated Stress Test-1 (AST-1) for TONC and Pt/C, respectively, where data was recorded in $N_2$-purged 0.1 M KOH, scan rate of 50 $mV \cdot s^{-1}$.
FIG. 6B shows another variation in the CV measurements obtained at different points in AST-1 for TONC and Pt/C, respectively, where data was recorded in $N_2$-purged 0.1 M KOH, scan rate of 50 $mV \cdot s^{-1}$.

The first AST performed involved subjecting both electrocatalysts to triangular-wave potential cycling between 0.05 $V_{RHE}$ and 1.25 $V_{RHE}$ in 0.1 M KOH at 25° C. for 20,000 cycles. The stability of the dopant in TONC structure and Pt NPs against agglomeration/dissolution was evaluated using a known protocol [13, 14]. FIG. 6A shows the variation in the CV profiles of the TONC over the course of the AST. The CV curves maintained their rectangular shape with no obvious growth of redox peaks characteristic [15]. The TONC electrocatalyst remained stable over the course of the stability test, showing only a slight change in capacity due to OH adsorption on the surface of metal oxide catalyst, while giving no indication of Ti, Cu, and Ni oxidation/corrosion. From the EIS data, 2 parameters were extracted: $R_\Sigma$ (where $R_\Sigma = R_{electronic} + R_{ionic}$) and $C_{dl}$ (series capacitance at 0.1 Hz). The value of $C_{dl}$ measured for TONC showed a slight decay over the course of 20,000 cycles, which is attributable to oxide formation on surface of catalyst layer. Likewise, $R_\Sigma$ remained small, decreasing slightly over the course of the AST, likely due to enhanced ion transport in the layer upon continued cycling. Together, this data indicates there was no change in either the electronic or ionic conductivity during the AST [8], and that there was minimal change in its surface area.

Figures 6C, 6D:
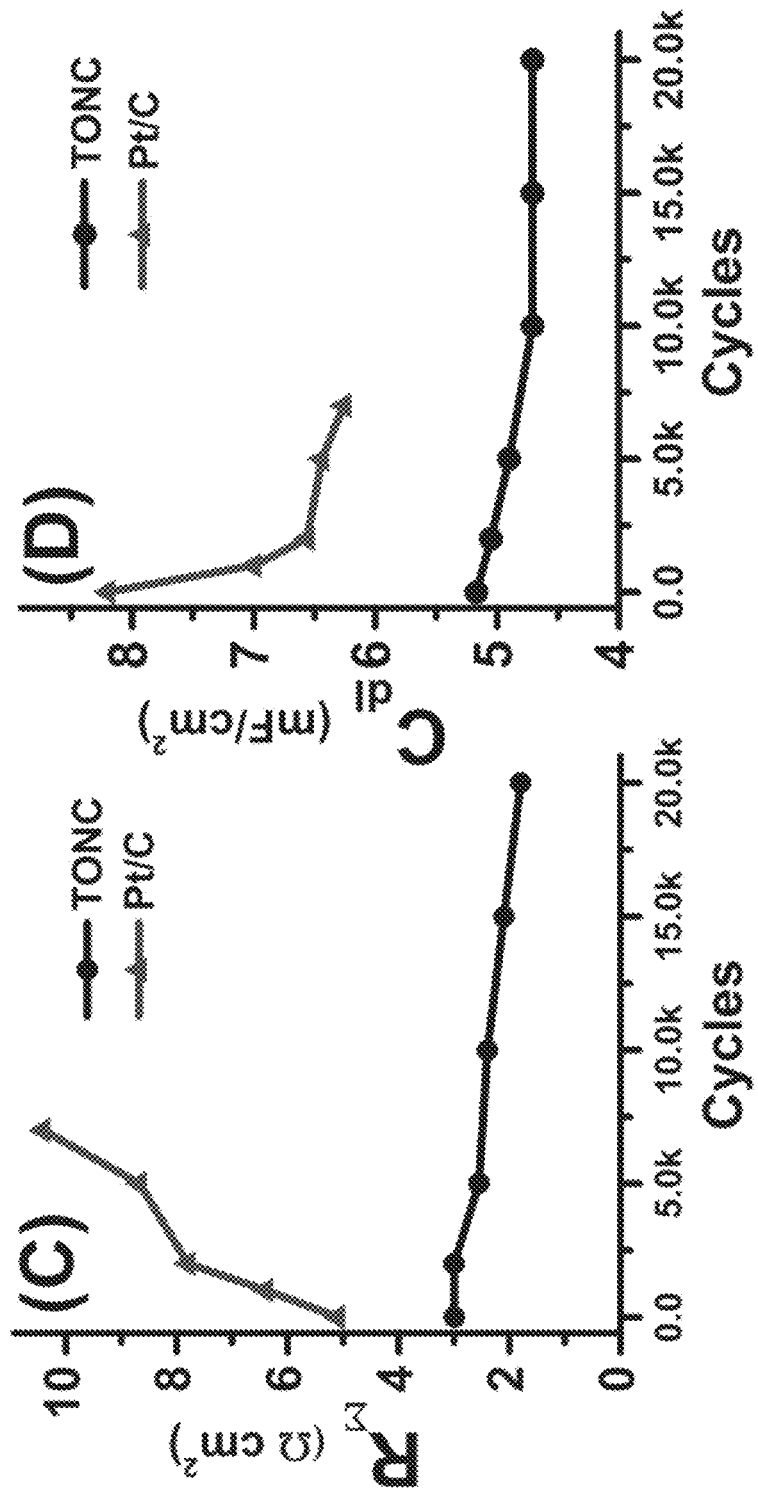
FIG. 6C shows variation in $R_\Sigma$ determined by Electrochemical Impedance Spectroscopy (EIS) for each catalyst during AST-1.
FIG. 6D shows variation in $C_{dl}$ determined by EIS for each catalyst during AST-1.

Conversely, Pt/C exhibited massive decay in electrochemically active surface area (ECSA) during the AST, losing 93% of its initial value after only 7000 cycles. Also, the cathodic peak of Pt oxide reduction shifted to higher potential over the course of the stability test, while the area under Pt oxidation/reduction reduced significantly assigned to Pt NPs sintering/agglomeration (FIG. 6B). Because of this substantial loss, the AST was stopped after 7000 cycles for Pt/C. EIS measurements on the Pt/C electrode revealed that RE increased sharply through the AST (FIG. 6C). Coupled with this was a 30% decline in $C_{dl}$ (FIG. 6D). Together, this indicates the Pt/C catalyst layer has severely degraded, most likely due to a decline in electronic conductivity [10, 16].

Figures 6E, 6F:
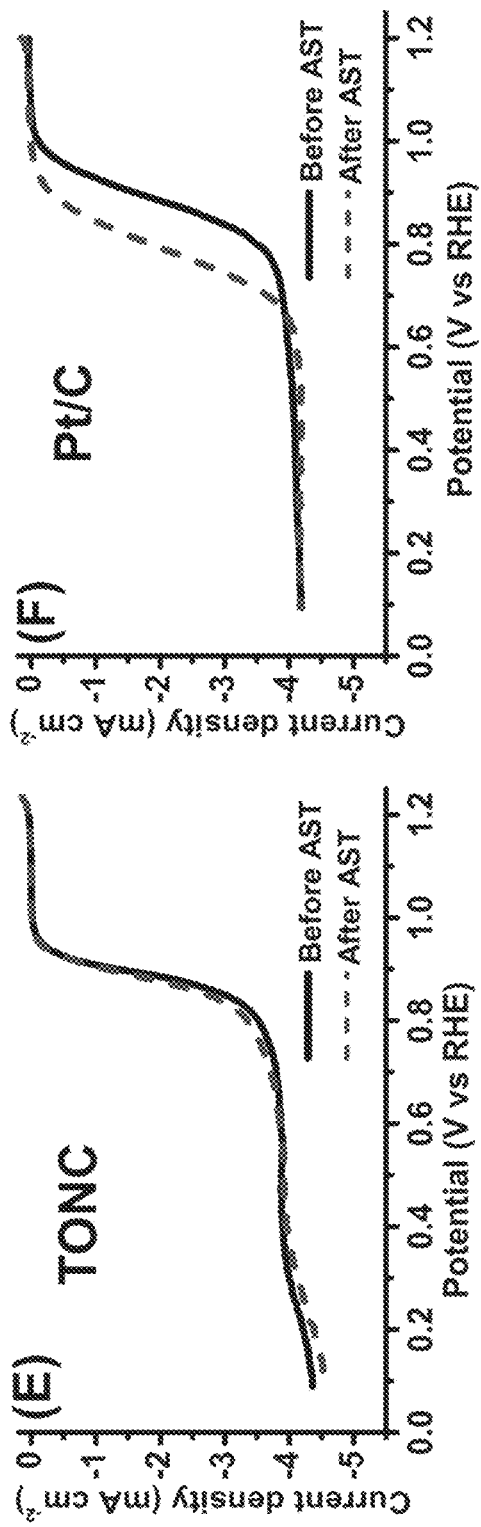
FIG. 6E shows a comparison of the ORR activity before and after AST for TONC, the ORR data recorded at 900 rpm in $O_2$-purged 0.1 M KOH and a scan rate of 5 mV $s^{-1}$.
FIG. 6F shows another comparison of the ORR activity before and after AST for Pt/C, the ORR data recorded at 900 rpm in $O_2$-purged 0.1 M KOH and a scan rate of 5 mV $s^{-1}$.

The ORR activity of both catalysts was assessed before and after the AST (FIGS. 6E and 6F). TONC shows outstanding durability with no change on onset potential and only an 8 mV decay in $E_{1/2}$, while Pt/C exhibited huge degradation, showing 50 mV decay in onset potential and 94 mV decreasing in $E_{1/2}$.

ORR Activity and Stability of TONC in Acidic Media

FIG. 7 shows the ORR activity of TONC (FIG. 7D) and Pt/C (FIG. 7H) in acidic media. While the ORR of TONC in acid was lower than that of Pt/C, there was still modest activity with an $E_{1/2}$ value of 0.62 $V_{RHE}$ which is noteworthy considering this material lacks the components found in most PGM-free catalysts (e.g. N, Fe, Co, C). Nevertheless, the durability of this material warrants investigation as both a moderately active catalyst and a potential support material for PGMs.

Figure 7A:
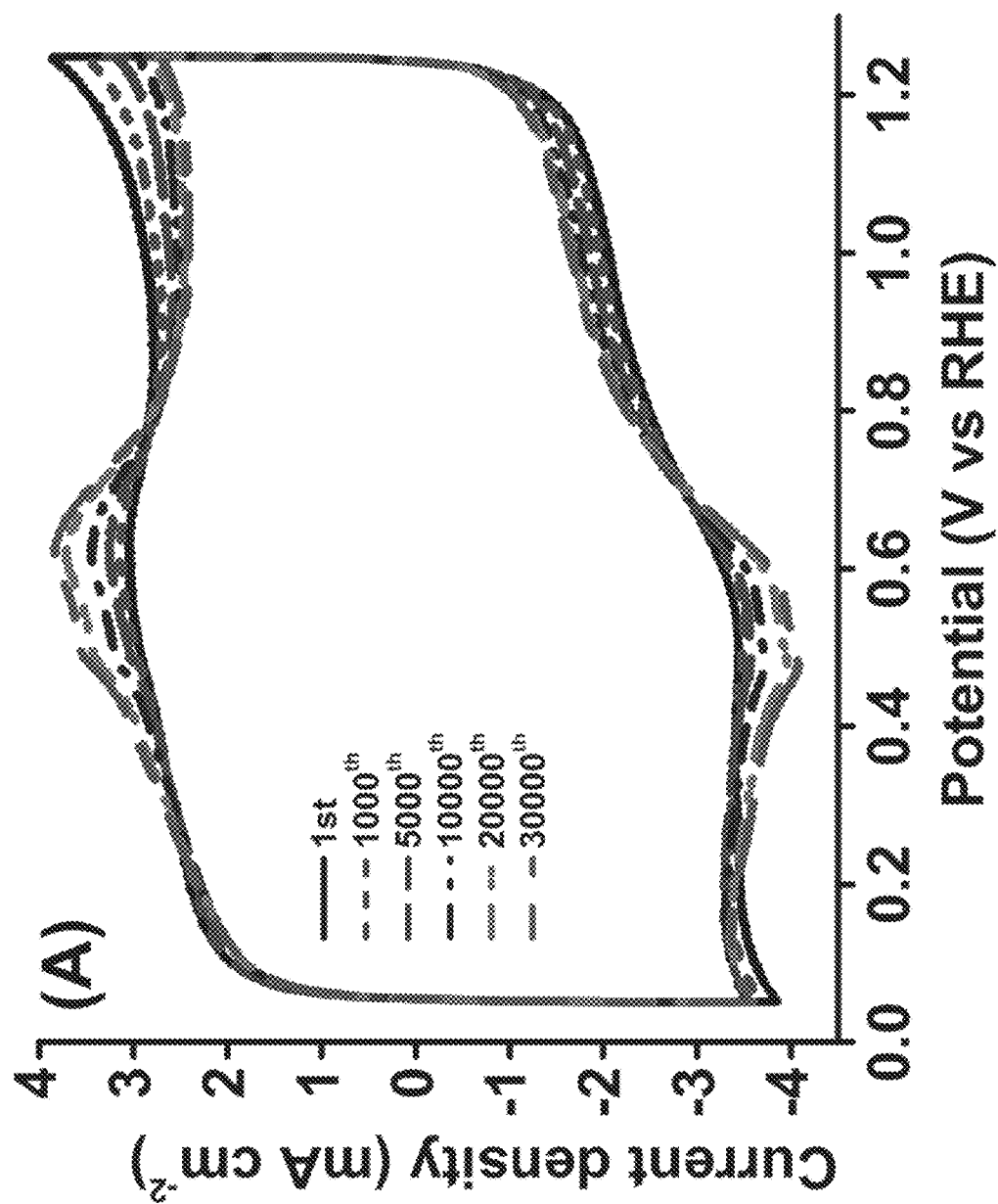
FIG. 7A shows a variation in the CV measurements obtained at different points in AST-2 for TONC and Pt/C, respectively, where data was recorded in $N_2$-purged 0.5 M $H_2SO_4$ at 25° C.
Figures 7B, 7C:
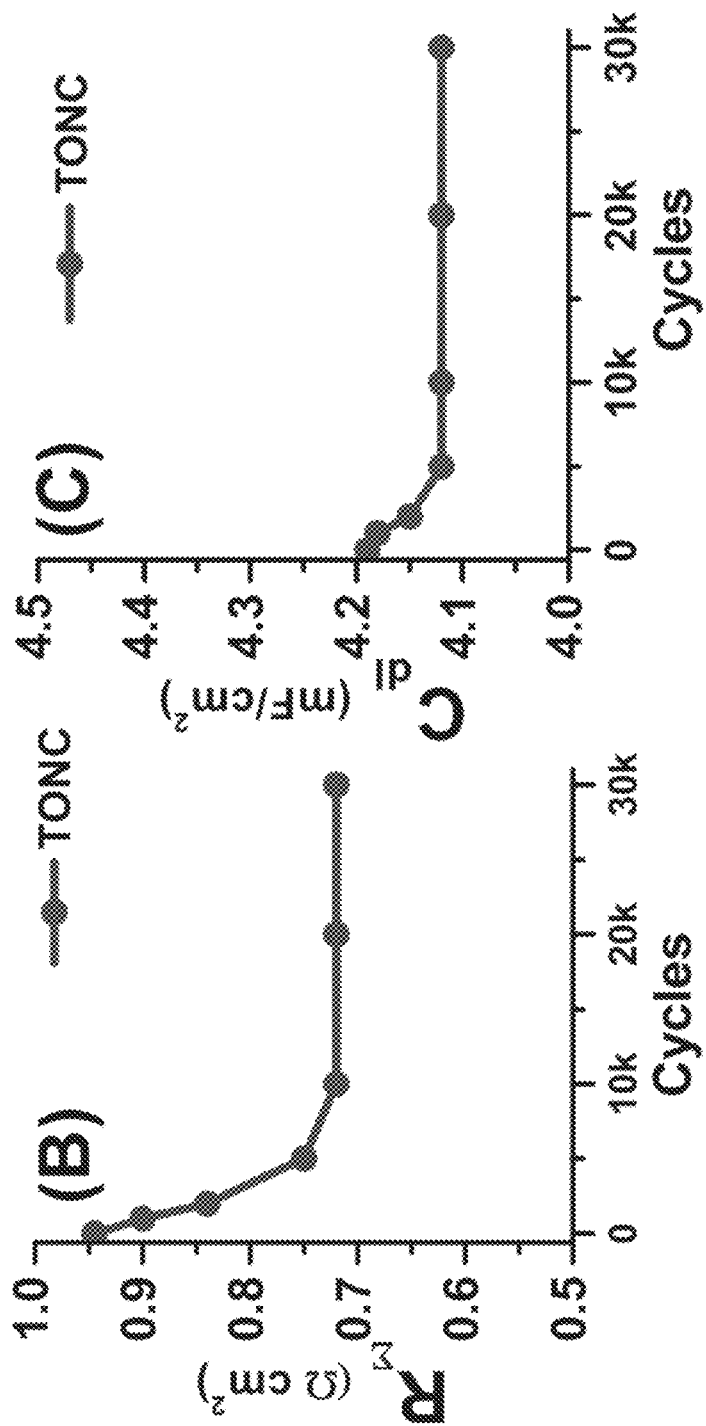
FIG. 7B shows variation in $R_\Sigma$ determined by EIS for TONC during AST-2.
FIG. 7C shows another variation in $R_\Sigma$ determined by EIS for TONC during AST-2.

The ex-situ electrochemical stability of the TONC was evaluated using ASTs that involved repeated cycling of the working electrode based on triangular-wave form in 0.5 M/0.1 M $H_2SO_4$ at different potential ranges according to protocols suggested by US Department of Energy. FIG. 7A shows the variation in the CV profiles of the TONC electrocatalyst in 0.5 M $H_2SO_4$, potential range of 0.05-1.25 $V_{RHE}$ for 30,000 cycles. The CV curves of the TONC electrocatalyst exhibited a rectangular shape with small double-reversible redox peaks at 0.49 $V_{RHE}$ and 0.62 $V_{RHE}$ assigned to NiO and CuO oxidation/reduction, respective [17, 18]. The capacitance remained stable over the course of stability test, while showing only a slight change in shape at high potential due to oxide adsorption/formation on the surface of the electrocatalyst. The double layer region of TONC was virtually unchanged, giving no indication of degradation/corrosion. FIGS. 7B and 7C show the variation in $R_\Sigma$ and $C_{dl}$ variation over the course of stability. $R_\Sigma$ for the TONC catalyst layer decreased during the initial stages of the test due to improving hydration of the catalyst layer, after which it remained stable over the course of AST. $C_{dl}$ showed a very small decay (2.4%) over the first 5000 cycles due to oxide formation of surface of catalyst layer and remained stable during the rest of stability test.

On the other hand, Pt/C catalyst degraded rapidly and lost more than 90% of its ECSA after 20,000 cycles. The cathodic reduction peak of Pt shifted to higher potential over the course of AST and the area under peak Pt oxidation/reduction reduced significantly assigned to massive Pt NPs agglomeration/dissolution (FIG. 7E). The EIS response of the Pt/C showed slight increase in $R_\Sigma$ during the AST and steady decline in $C_{dl}$ due to the massive loss of Pt surface area. This EIS decay profile is consistent with the expected profile for Pt particle size growth in the absence of support corrosion [7, 10].

Figure 7D:
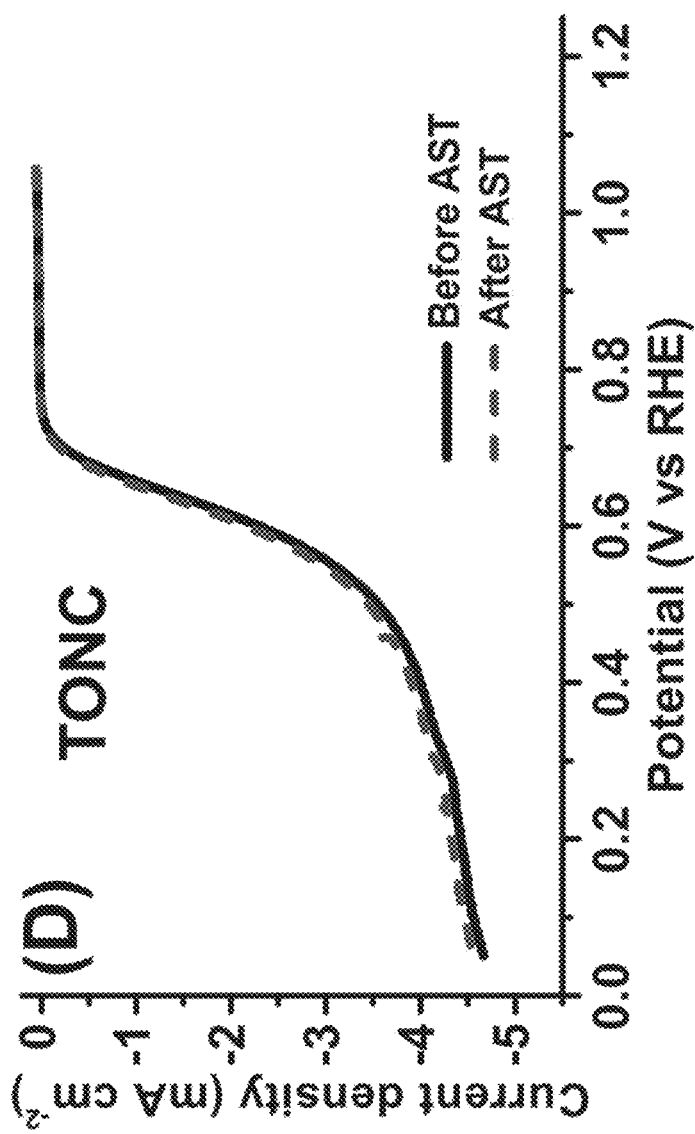
FIG. 7D shows a comparison of the ORR activity before and after AST-2 for TONC, the ORR data recorded at 900 rpm in $O_2$-purged 0.5 M $H_2SO_4$ at a scan rate of 5 $mV \cdot s^{-1}$.
Figure 7E:
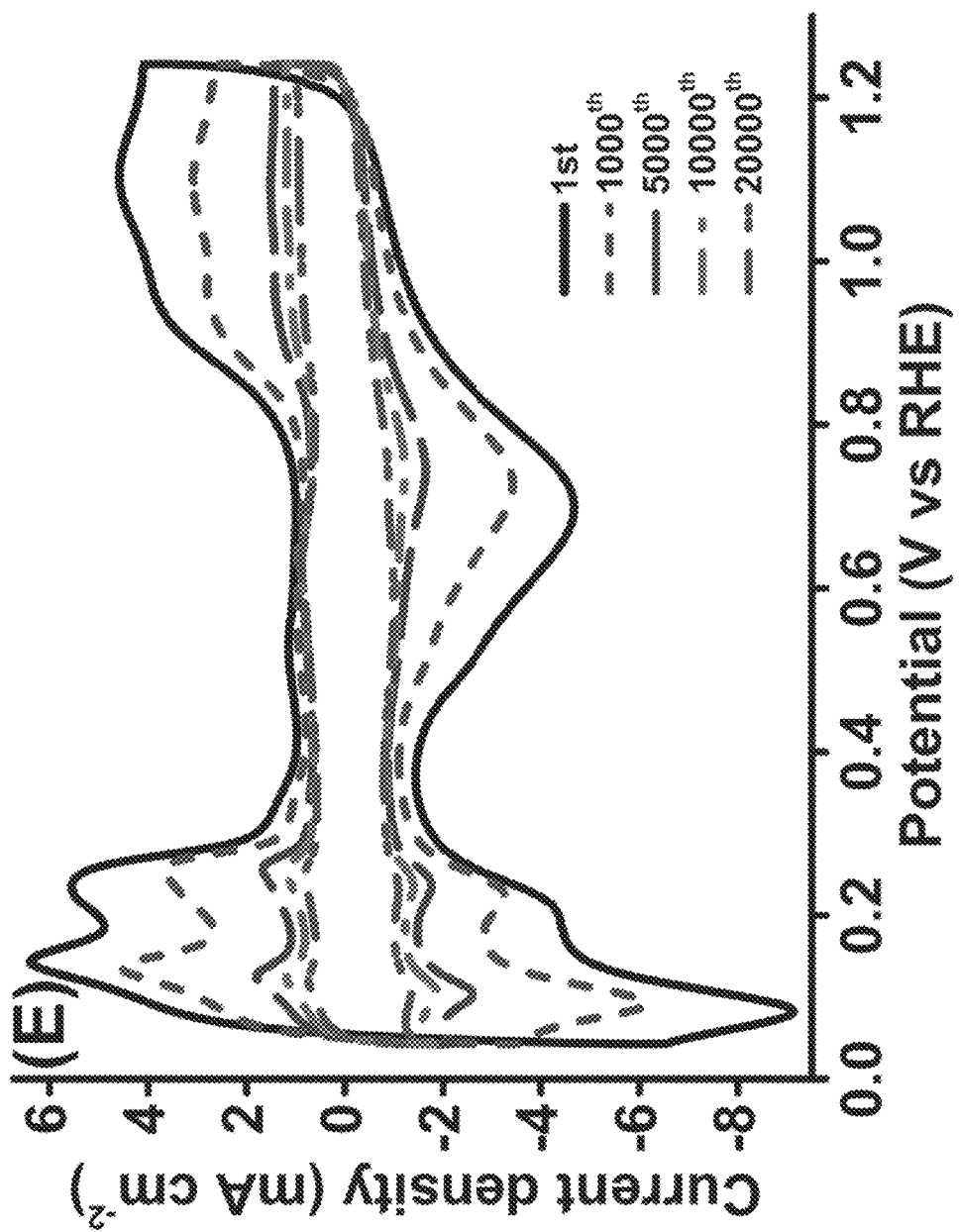
FIG. 7E shows another variation in the CV measurements obtained at different points in AST-2 for TONC and Pt/C, where data was recorded in $N_2$-purged 0.5 M $H_2SO_4$ at 25° C.
Figures 7F, 7G:
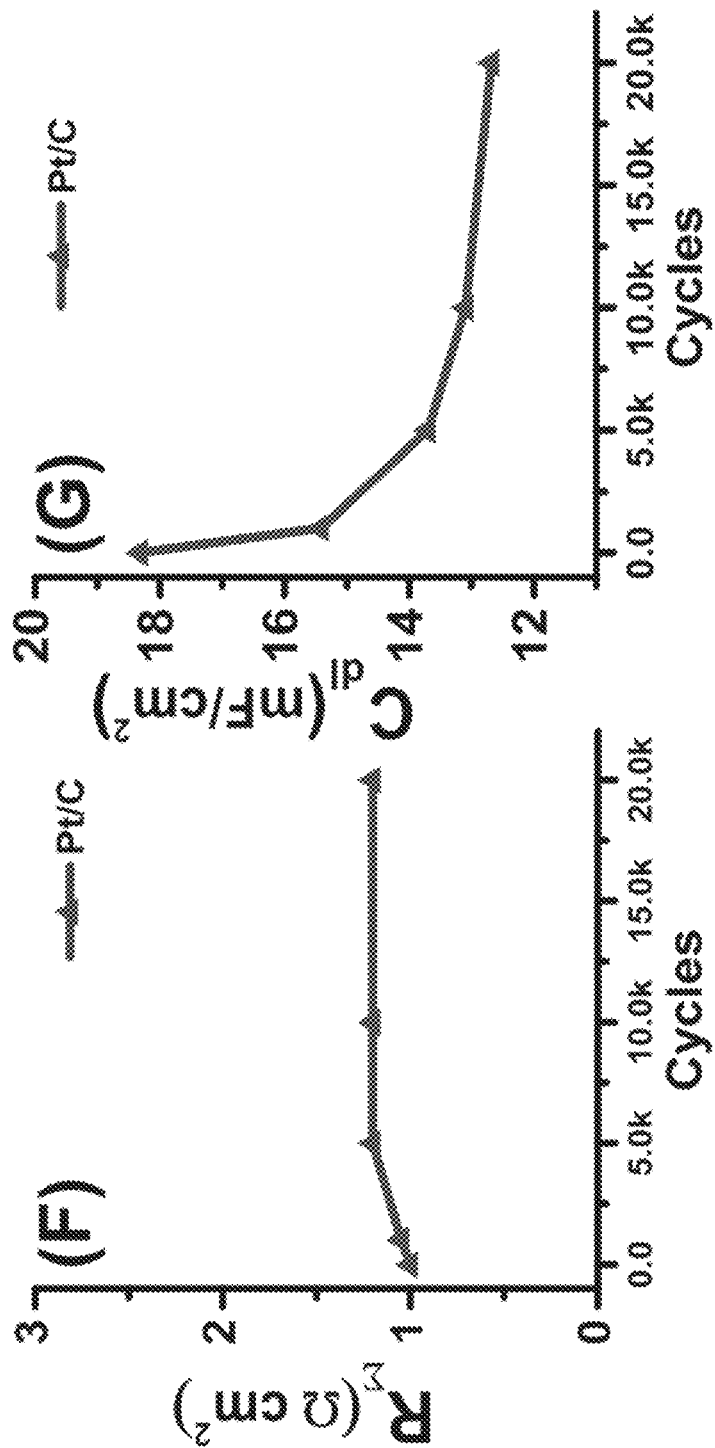
FIG. 7F shows variation in $R_\Sigma$ determined by EIS for Pt/C during AST-2.
FIG. 7G shows another variation in $R_\Sigma$ determined by EIS for Pt/C during AST-2.
Figure 7H:
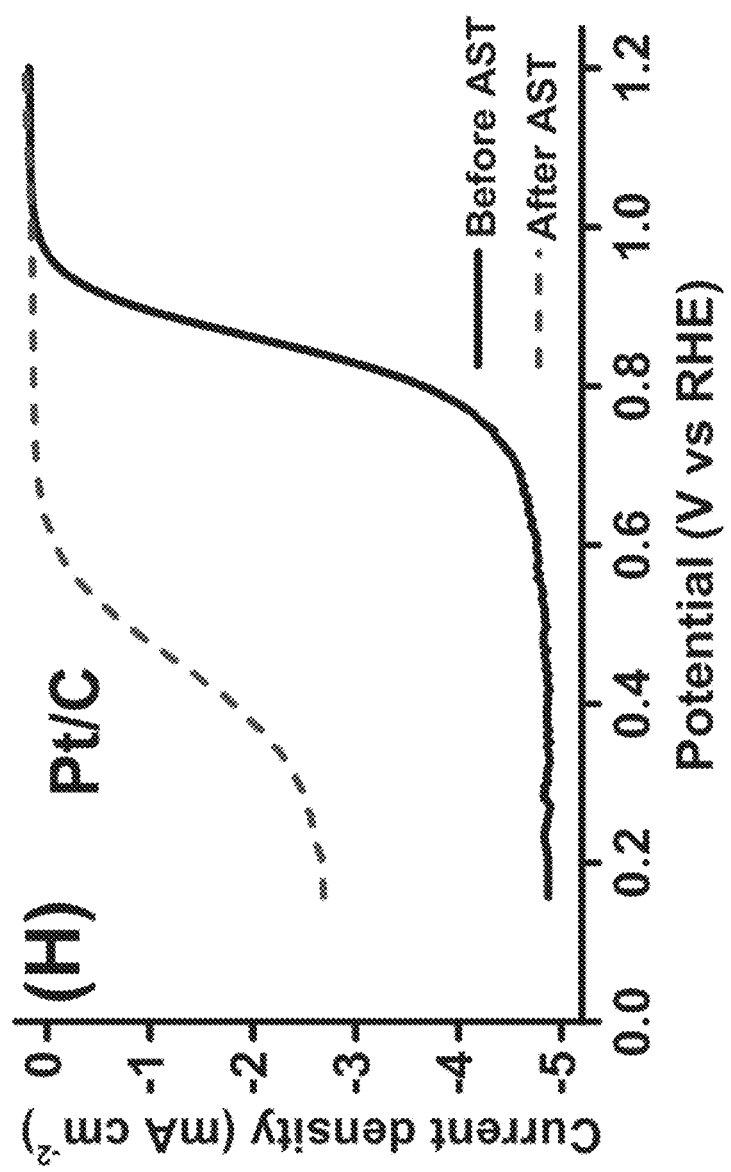
FIG. 7H shows a comparison of the ORR activity before and after AST-2 for Pt/C, the ORR data recorded at 900 rpm in $O_2$-purged 0.5 M $H_2SO_4$ at a scan rate of 5 $mV \cdot s^{-1}$.

The ORR activity of both catalysts was assessed before and after the AST (FIGS. 7D and 7H). The TONC catalyst maintained its activity, with no decay in onset potential and $E_{1/2}$ after AST. However, the Pt/C catalyst showed a massive degradation in ORR activity over the course of stability test, showing a 420 and 490 mV decay in onset potential and $E_{1/2}$ respectively. In fact, at the end of the AST, the TONC catalyst was substantially more active than the Pt/C catalyst. A summary of key electrochemical parameters and ORR activity of both catalysts are summarized in Table 4.

TABLE 4

Summary of electrochemical properties of TONC and Pt/C electrocatalysts in acid media before and after AST-2.

| Catalyst | Pt$_{loading}$ [mg cm$^{-2}$] | E$_{onset}$ B-AST [V$_{RHE}$] | E$_{onset}$ A-AST [V$_{RHE}$] | E$_{1/2}$ B-AST [V$_{RHE}$] | E$_{1/2}$ A-AST [V$_{RHE}$] |
|---|---|---|---|---|---|
| TONC | PGM-free | 0.75 | 0.75 | 0.62 | 0.62 |
| Pt/C-JM20% | 0.03 | 0.98 | 0.56 | 0.86 | 0.37 |

Figure 8A:
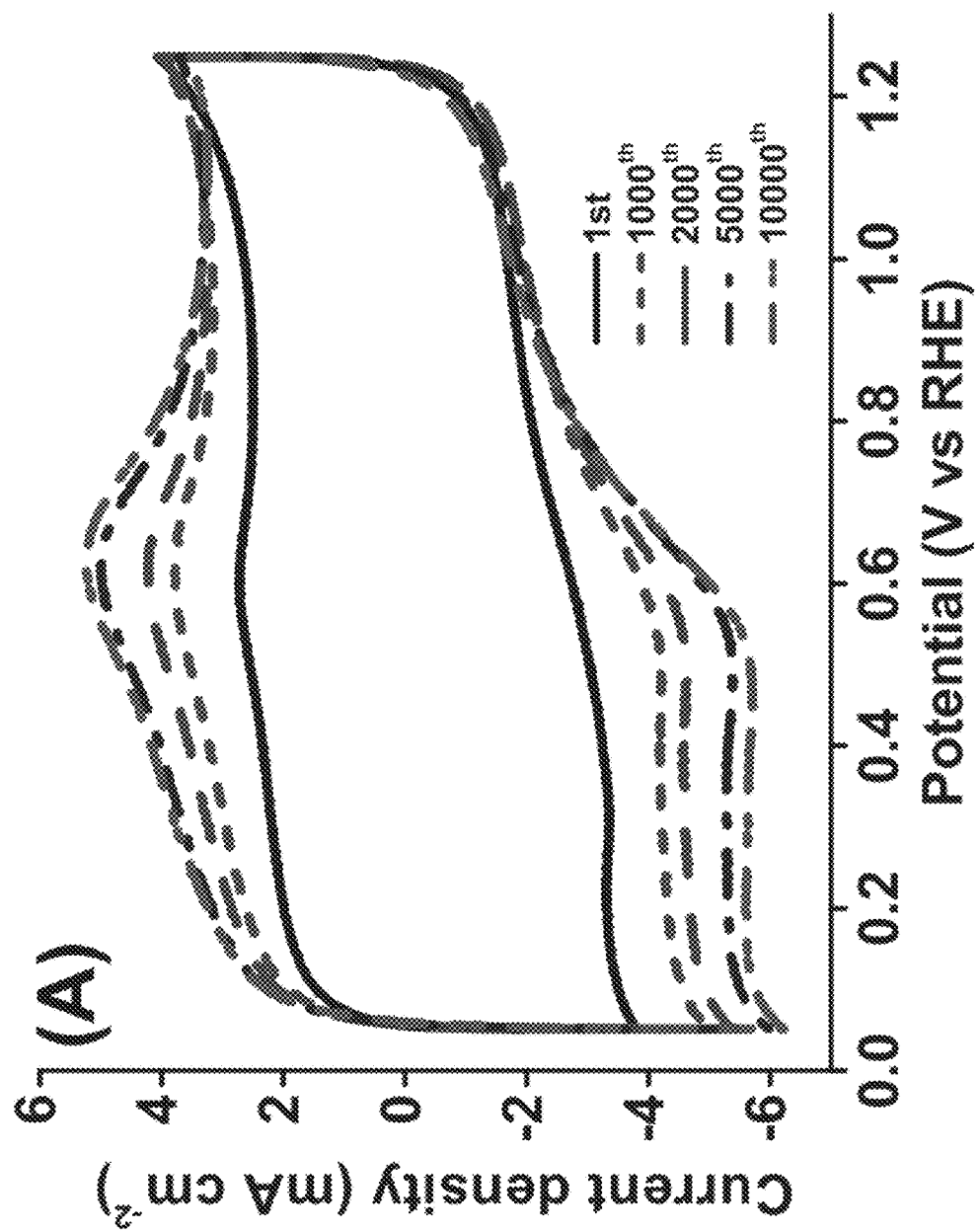
FIG. 8A shows a variation in the CV measurements obtained at different points in AST-3 for TONC and Pt/C, respectively, where data was recorded in $N_2$-purged 0.5 M $H_2SO_4$ at 25° C.
Figures 8B, 8C:
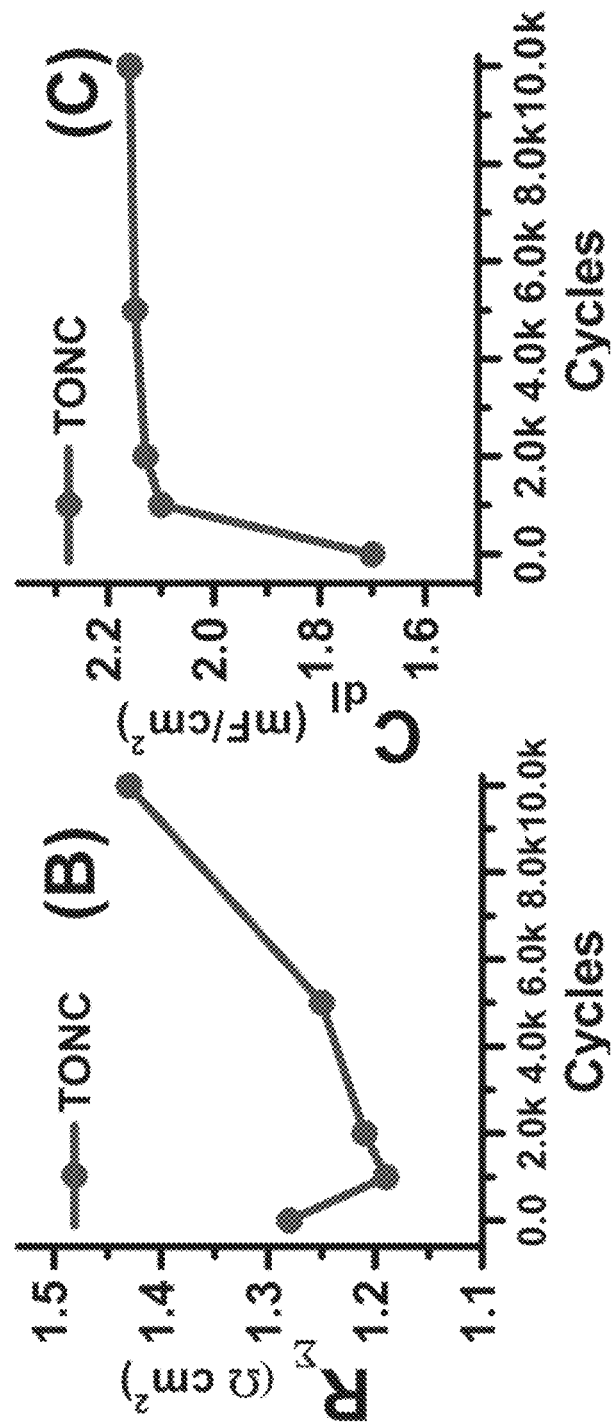
FIG. 8B shows a variation in $R_\Sigma$ determined by EIS for TONC during AST-3.
FIG. 8C shows another variation in $R_\Sigma$ determined by EIS for TONC during AST-3.

To further probe the stability of the TONC catalyst, AST-3 was performed which mimics fuel cell vehicle startup-shutdown condition. The AST-3 employed a triangular-wave form between 1-1.5 V$_{RHE}$ at a scan rate of 500 mV/s in 0.1 M H$_2$SO$_4$ for 10,000 cycles and probed the corrosion stability of the catalyst. Over the course of AST, the TONC catalyst exhibited some modification on the double layer region, resulting in an increase of catalyst layer capacitance due to enhanced accessibility of micropores (FIG. 8A). However, R$_\Sigma$ remained quite stable (after hydration) and low (FIG. 8B), only increasing ca. 0.15 Ωcm$^2$, indicating no change in its conductivity during the test. Furthermore, C$_{dl}$ increased slightly during the first 1000 cycles of AST which may be due to enhanced accessibility of micropores catalyst layer. After the first 1000 cycles the measured value of C$_{dl}$ for the catalyst remained stable throughout the AST (FIG. 8C).

Figure 8D:
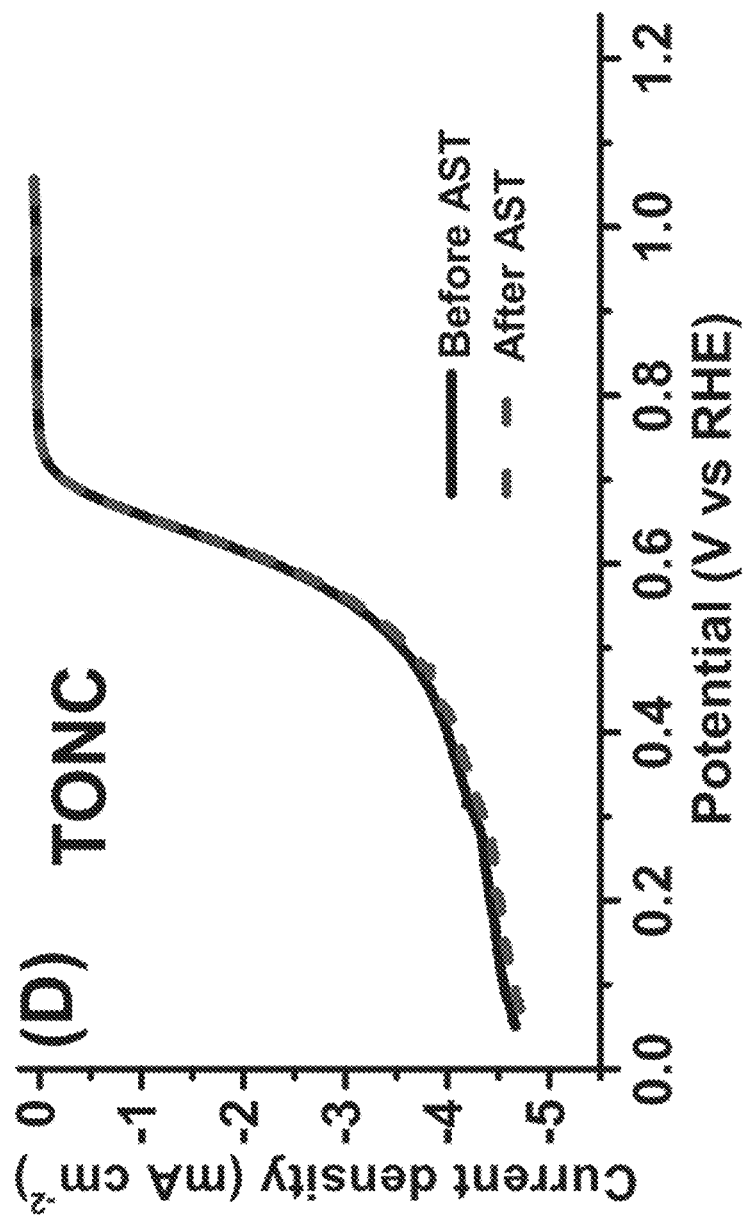
FIG. 8D shows a comparison of the ORR activity before and after AST-3 for TONC, the ORR data recorded at 900 rpm in $O_2$-purged 0.5 M $H_2SO_4$ at a scan rate of 5 $mV \cdot s^{-1}$.
Figure 8E:
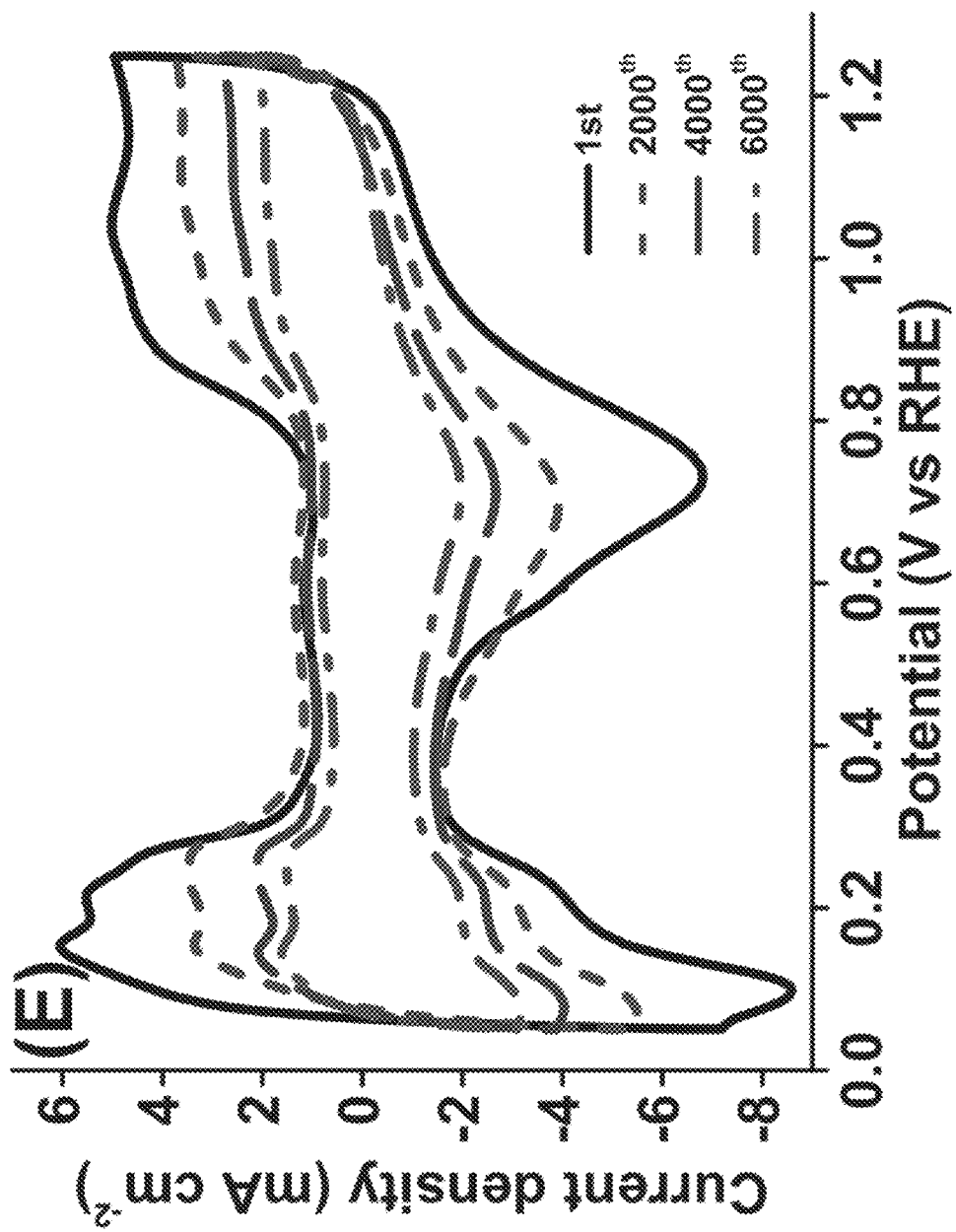
FIG. 8E shows another variation in the CV measurements obtained at different points in AST-2 for TONC and Pt/C, where data was recorded in $N_2$-purged 0.5 M $H_2SO_4$ at 25° C.
Figures 8F, 8G:
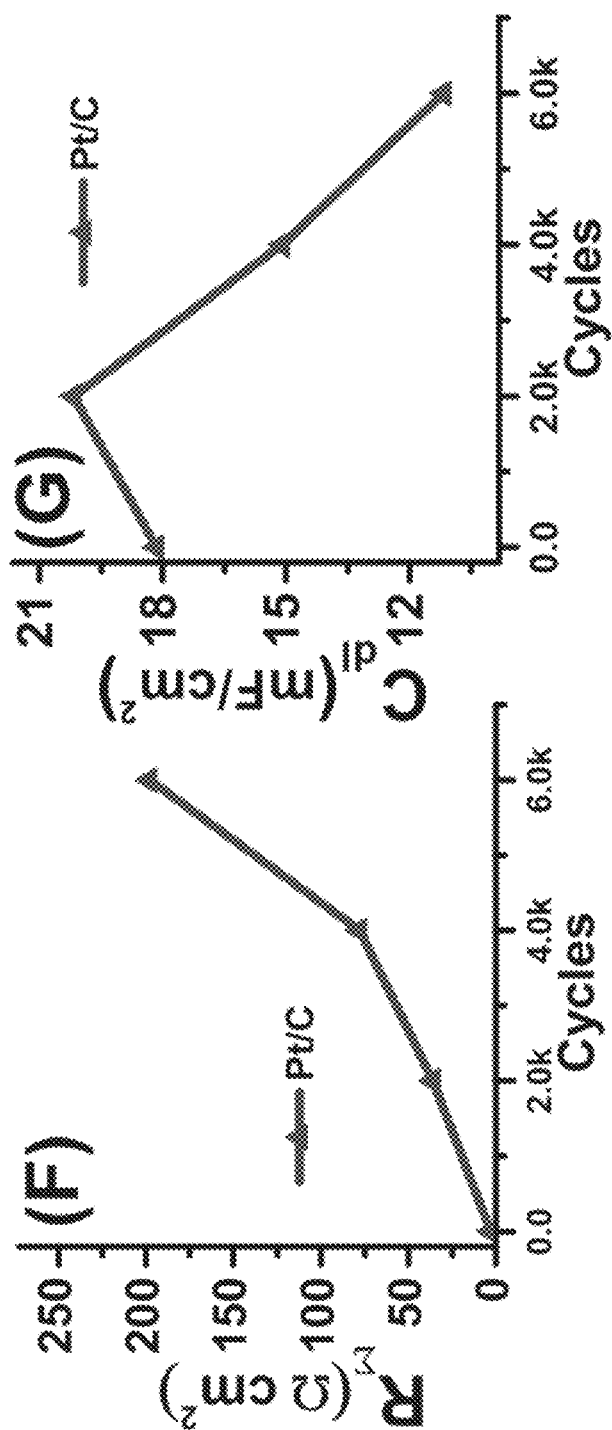
FIG. 8F shows variation in $R_\Sigma$ determined by EIS for Pt/C during AST-3.
FIG. 8G shows another variation in $R_\Sigma$ determined by EIS for Pt/C during AST-3.

Conversely, the Pt/C catalyst displayed a rapid decline in ECSA, losing more than 80% of its initial ECSA after only 6000 cycles (FIG. 8E). Because of this extremely rapid decay the test was ceased after 6000 cycles for Pt/C. Impedance measurements shows that R$_\Sigma$ of the Pt/C catalyst layer increased steadily throughout the AST. Furthermore, C$_{dl}$ initially increased, which was attributed to the oxidative formation of pseudo-capacitive groups on the carbon surface [19], and further C$_{dl}$ declined upon continued cycling, which is characteristic of the EIS response of carbon support corrosion [10] (FIGS. 8F-8G).

Figure 8H:
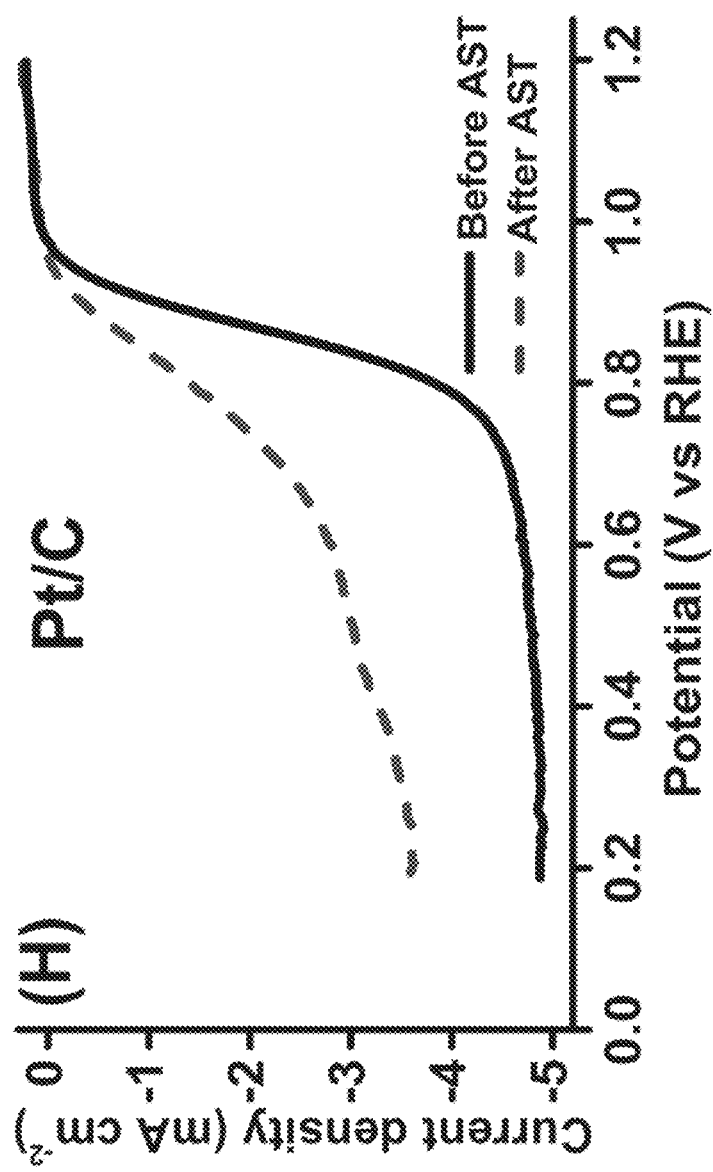
FIG. 8H shows a comparison of the ORR activity before and after AST-3 for Pt/C, the ORR data recorded at 900 rpm in $O_2$-purged 0.5 M $H_2SO_4$ at a scan rate of 5 $mV \cdot s^{-1}$.

FIGS. 8D and 8H compare the ORR activity of both catalysts before and after the AST. The TONC catalyst shows excellent durability and maintained its ORR activity, showing no decay in onset potential and E$_{1/2}$, whereas the ORR activity of the Pt/C catalyst decayed considerably by decreasing 102 mV of E$_{1/2}$.

Example Composition 1B: 20% Pt/TONC

Here 20 wt % Pt was deposited onto the TONC material (hereafter referred to as Pt/TONC) in order to evaluate the effectiveness of TONC as a catalyst support for PGM-type catalysts. FIGS. 9A and 9B show the XRD pattern and a TEM image obtained, respectively, for the Pt/TONC catalyst. The XRD pattern indicates that the Pt nanoparticles show all expected peaks for fcc Pt. However, the peaks are shifted to higher angles, which is indicative of a strong metal-support interaction (SMSI) between Pt and the metal oxide support. It may also be indicative of some alloying with Cu dopants. TEM images show that the Pt nanoparticles are well dispersed and have an average diameter of 4 nm.

ORR Activity and Stability of Pt/TONC in Acidic Media

Figures 10A, 10B:
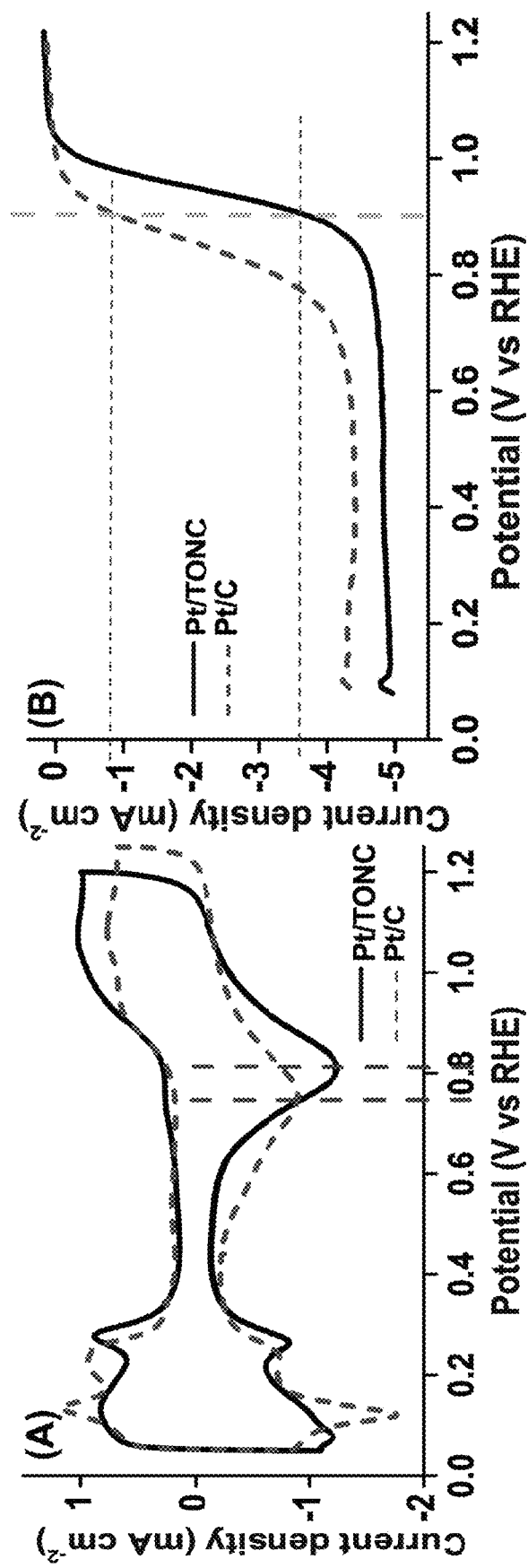
FIG. 10A shows comparisons of the CV measurements obtained for Pt/TONC and Pt/C recorded in $N_2$-purged 0.5 M $H_2SO_4$ and a scan rate of 20 $mV \cdot s^{-1}$.
FIG. 10B shows a comparison of the ORR activity of Pt/TONC and Pt/C recorded in $O_2$-saturated purged 0.5 M $H_2SO_4$, at a scan rate of 5 $mV \cdot s^{-1}$ and 1200 rpm.

FIG. 10A compares the CV measurements obtained for Pt/TONC and Pt/C catalysts in acidic media. Both catalysts display well-defined Pt surface electrochemistry. However, the reduction of the Pt oxide peak is shifted to considerably higher potentials for the Pt/TONC (denoted as blue lines), which arises from the SMSI effect. FIG. 10B compares the ORR activity of Pt/TONC and commercial Pt/C catalysts. The Pt/TONC catalyst exhibited a very high onset potential of 1.05 V$_{RHE}$ for O$_2$ reduction with an E$_{1/2}$ of 0.93 V$_{RHE}$. These values are considerably higher than that measured for Pt/C and are attribute to the SMSI between Pt and TONC.

Figures 11A, 11B:
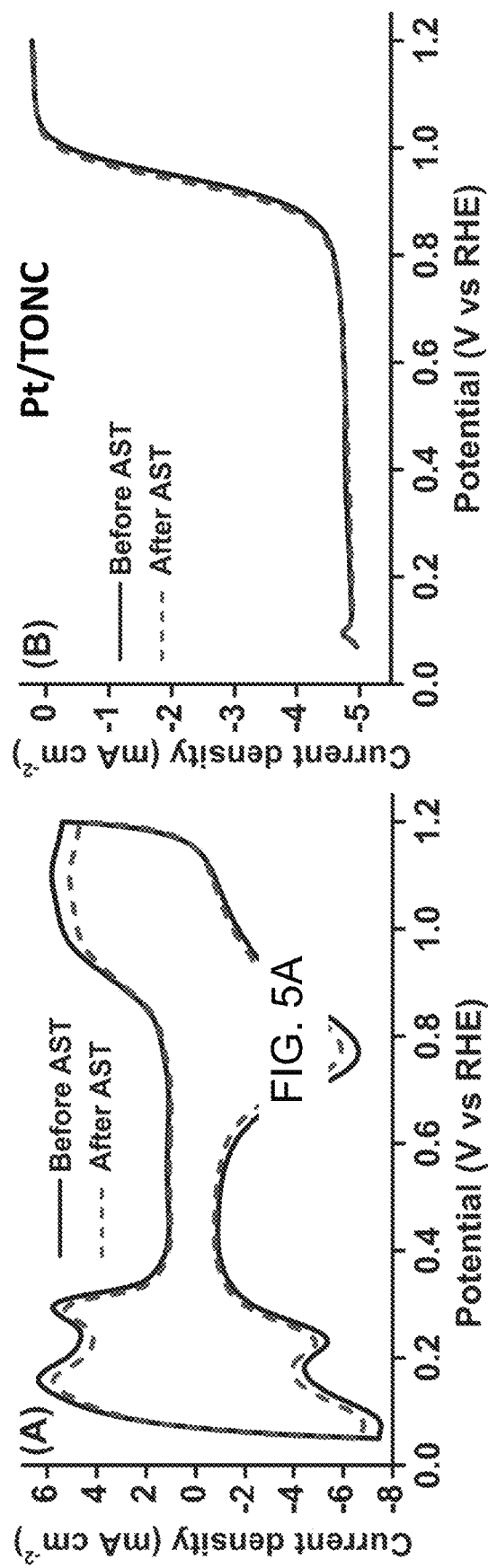
FIG. 11A shows comparisons of the CV measurements obtained for Pt/TONC recorded in $N_2$-purged 0.5 M $H_2SO_4$ before AST-1 (BAST) and after AST-1 (AAST) (scan rate=20 $mV \cdot s^{-1}$).
FIG. 11B shows a comparison of the ORR activity of TONC BAST and AAST (a total of 10,000 cycles were performed and data was recorded in $O_2$-saturated purged 0.5 M $H_2SO_4$, scan rate of 5 $mV \cdot s^{-1}$ and 1200 rpm).

The durability of Pt/TONC in acid was assessed by subjecting it to an AST-1 that involved 10,000 cycles between a potential range of 0.05-1.25 V$_{RHE}$. FIG. 11A compares the CV curve obtained for Pt/TONC before and after AST-1. The ECSA of Pt decayed by only 10.6%, which is considerably lower than the 80% loss observed for Pt/C (see FIGS. 7A-7H, described above). The ORR activity of Pt/TONC was assessed before and after the AST and is shown in FIG. 11B. Only a very small decline of 10 mV in E$_{1/2}$ values was observed for Pt/TONC. The high durability and retention of the ORR activity arises from the SMSI between the Pt nanoparticles and the TONC support.

Example Composition 2: Pt/TOS

Synthesis of the Ti3O5Si0.4 (TOS) support

The TOS support was prepared by doping commercial TiO$_2$ anatase with silicon (Si). TiO$_2$ was dispersed in a solution of (70:30 vol %) ultrapure water and ethanol, followed by the addition of 2 wt % Pluronic P123 surfactant. The obtained solution was stirred for 2 h at ambient temperature. Then 20 wt % of Si was added to the solution. The solution was continuously stirred at room temperature for another 5 h under N$_2$ purging and dried at 80° C. The obtained powder was annealed at 1000° C. (using a heating rate of 10° C. min$^{-1}$) for 8 h under a reducing atmosphere (H$_2$:N$_2$ 10:90 vol %).

Synthesis of the Pt/Ti$_3$O$_5$Si$_{0.4}$ (Pt/TOS) Electrocatalyst

The synthesis of the Pt/TOS catalyst was performed by adding the TOS support to 100 mL of deionized water; the mixture was left to stir for 1 h under ambient temperature. A solution of H$_2$PtCl$_6$·xH$_2$O and deionized water was added dropwise to the TOS solution, and stirring continued for 2 h. After 2 h, the solution was purged under H$_2$ gas for 1 h and then sealed and left to stir for 24 h. The obtained solution was filtered, washed, and dried at 80° C. in an N$_2$ atmosphere. The resulting sample was heat treated at 320° C. (heating rate of 5° C. min$^{-1}$) for 3 h under a reducing atmosphere (H$_2$:N$_2$ 10:90 vol %).

Physical Properties of Pt/TOS

The electronic band gap and electrical conductivity of TOS is reported in Table 3. These values are comparable to that reported for TOMS, indicating the doping process was successful in creating a material with suitable electronic properties.

Figures 12A, 12B:
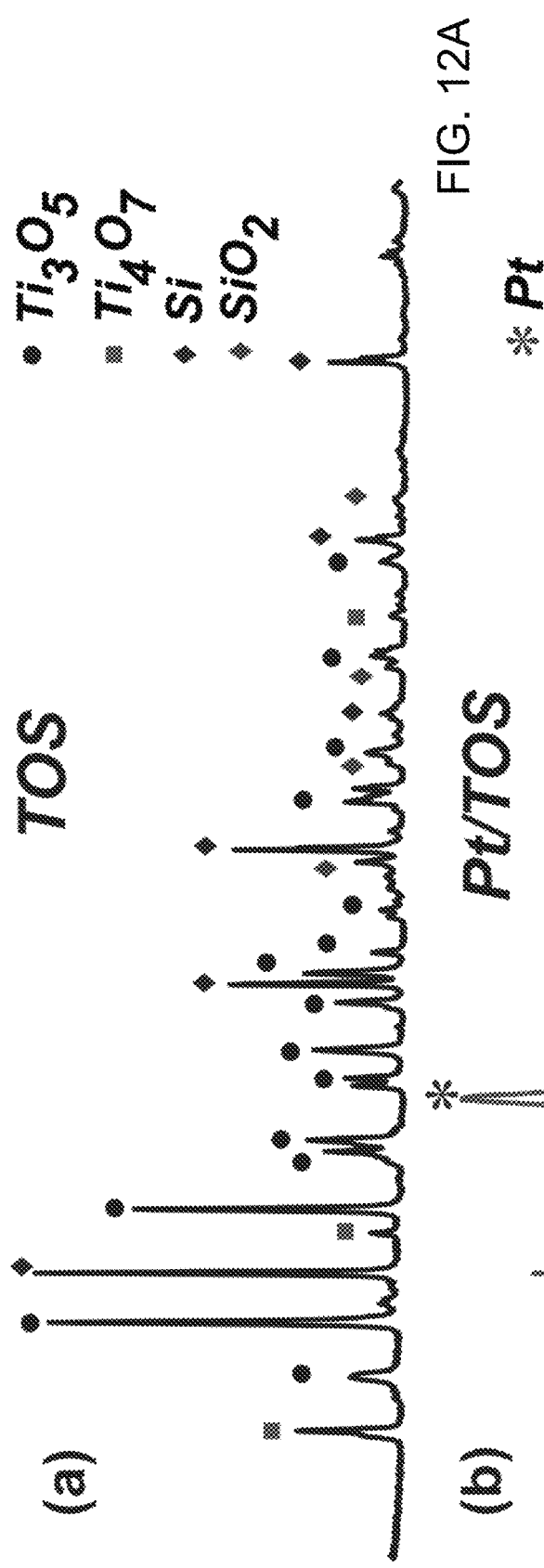
FIG. 12A shows the XRD pattern of the TOS support.
FIG. 12B shows the XRD pattern of the Pt/TOS electrocatalyst.

FIG. 12A shows the XRD pattern obtained from the TOS support structure. The presence of Si favors the formation of the titanium suboxides in a reducing environment. The corresponding diffractogram showed that the support mostly consists of Ti$_3$O$_5$ phases with the main characteristic reflection at 2θ=25.35° (110). The silicon in the TOS structure exhibited as both metallic Si (ICDD card no. 01-078-2500) and SiO$_2$ (ICDD card no. 00-046-1242). FIG. 12B shows the XRD pattern obtained for the Pt/TOS electrocatalyst, with metallic platinum present in a face-centered cubic (fcc) structure (ICDD card no. 01-087-0640), with typical reflections at 2θ=40.1°, 46.46°, 67.95°, 81.61° and 86.25° [20-

23]. All corresponding Pt peaks were shifted toward higher angles, indicating a diminution of the lattice spacing. This phenomenon is attributed to the strong interaction between Pt and the TOS support.

The electronic band gap and electrical conductivity of TOS is reported in Table 3. These values are comparable to that reported for TOMS, indicating the doping process was successful in creating a material with suitable electronic properties.

ORR Activity and Stability of Pt/TOS

Figures 13A, 13B:
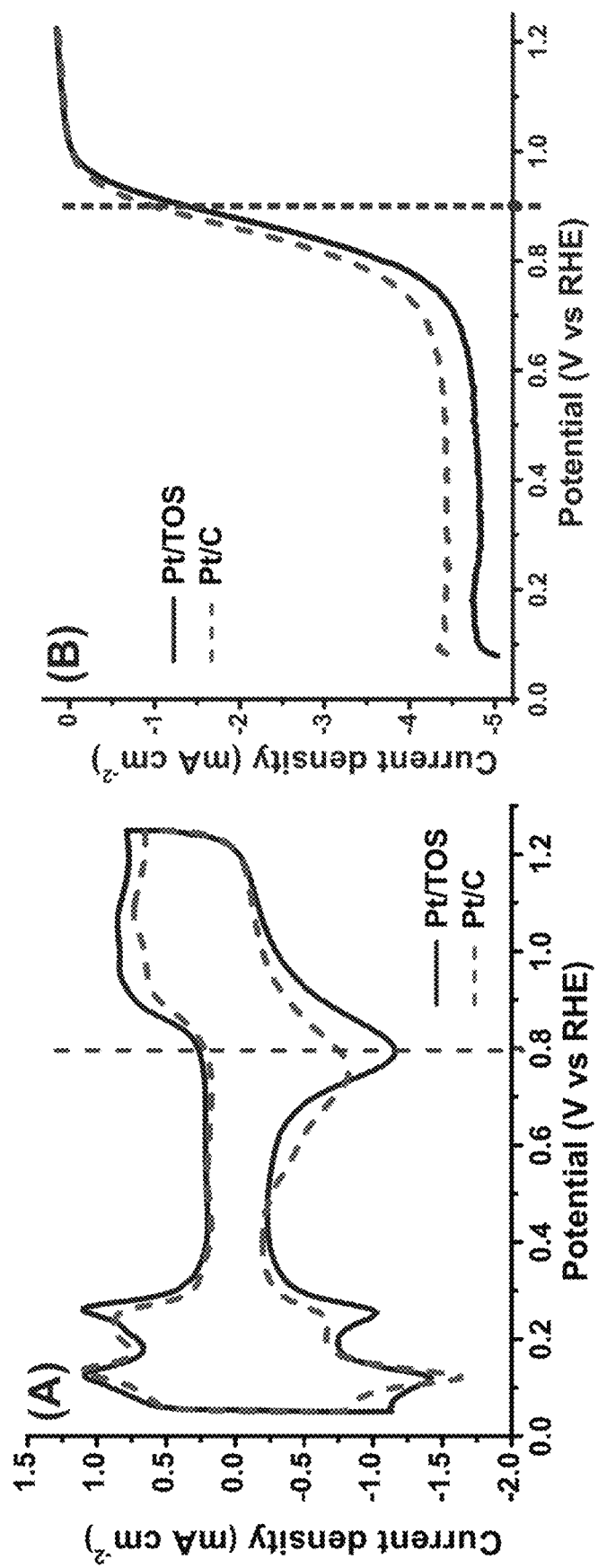
FIG. 13A shows comparisons of the CV measurements obtained for Pt/TOS and Pt/C recorded in $N_2$-purged 0.5 M $H_2SO_4$ and a scan rate of 20 $mV \cdot s^{-1}$.
FIG. 13B shows a comparison of the ORR activity of Pt/TOS and Pt/C recorded in $O_2$-saturated purged 0.5 M $H_2SO_4$ at a scan rate of 5 mV s$^{-1}$ and 1200 rpm.

FIG. 13A compares the CV measurements obtained for Pt/TOS and Pt/C catalysts in acidic media. Both catalysts display well defined Pt surface electrochemistry. However, the reduction of the Pt oxide peak is shifted to considerably higher potentials for the Pt/TOS, which arises from the SMSI effect. FIG. 13B compares the ORR activity of Pt/TOS and commercial Pt/C catalysts. The Pt/TOS catalyst exhibited a very high onset potential of 1.01 $V_{RHE}$ for $O_2$ reduction with an $E_{1/2}$ of 0.88 $V_{RHE}$. These values are considerably higher than that measured for Pt/C and are attributed to the SMSI between Pt and TOS.

Figures 14A, 14B:
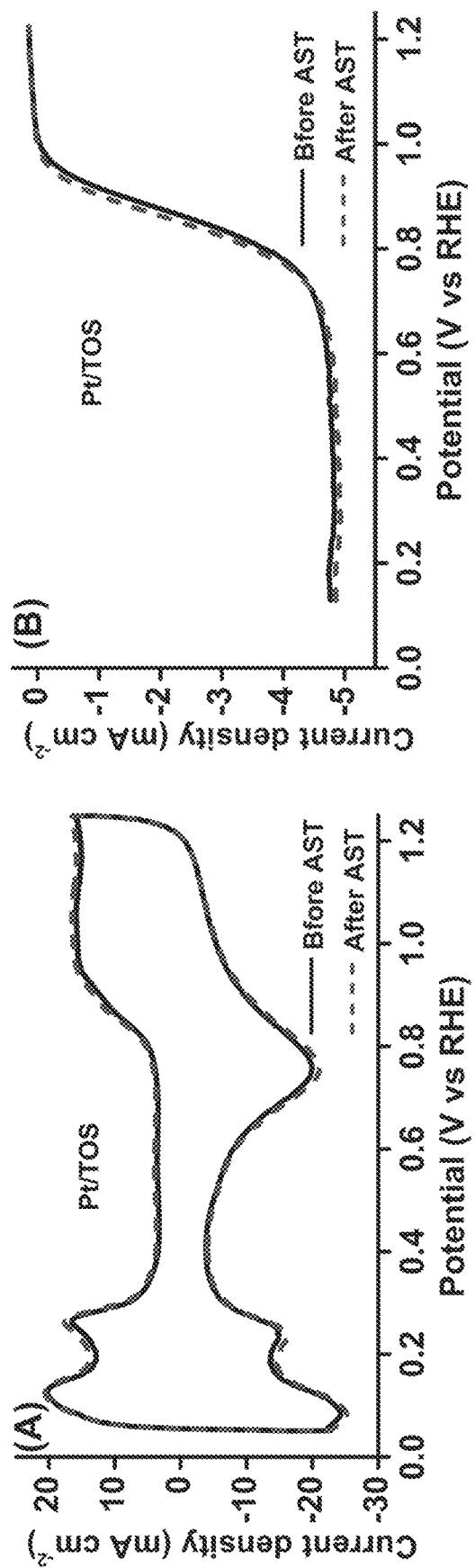
FIG. 14A shows comparisons of the CV measurements obtained for Pt/TOS recorded in $N_2$-purged 0.1 M $H_2SO_4$ before AST-3 (BAST) and after AST-3 (AAST) (scan rate=200 mV s$^{-1}$).
FIG. 14B shows a comparison of the ORR activity of Pt/TOS BAST and AAST (a total of 10,000 cycles were performed and data was recorded in $O_2$-saturated 0.5 M $H_2SO_4$ at a scan rate of 5 mV s$^{-1}$ and 1200 rpm).

The durability of Pt/TOS was tested according to the fuel cell vehicle startup-shutdown condition using AST-3 for 10,000 cycles. FIG. 14A compares the CV measurements obtained before and after the AST-3. Pt/TOS showed high stability over the course of this test with no decay in ECSA and no sign of surface modification/degradation on double layer region. FIG. 14B compares the ORR activity of Pt/TOS before and after startup-shutdown AST. The Pt/TOS electrocatalyst exhibited durability, showing only a 14 mV decay in $E_{1/2}$, which is considerably less than that exhibited by Pt/C (see FIG. 8). The high stability and durability of Pt/TOS arises from the SMSI between Pt NPs and TOS support. On the other hand, the Pt/C catalyst lost its activity due to carbon corrosion and weak interaction between Pt NPs and carbon support.

Example Composition 3: Pt/NbOS

Synthesis of the NbOSi (NbOS) support

Commercial $Nb_2O_5$ was treated through the one step autoclave process in 10 M KOH at 150° C. for 48 h. NbOS was prepared by doping the obtained surface-treated $Nb_2O_5$ with Silicon (Si). 15 wt % of Si was dispersed in a solution of acetonitrile, followed by the addition of 2 wt % Pluronic P123 surfactant, under $N_2$ purging. The obtained solution was sonicated and stirred for 2 h at ambient temperature. Later $Nb_2O_5$ was added to the solution and continuously stirred at room temperature for another 12 h under $N_2$ purging and dried at 70° C. The obtained powder was heat-treated at 1000° C. (using a heating rate of 8° C. $min^{-1}$) for 4 h under a reducing atmosphere ($H_2:N_2$, 20:80 vol %).

Synthesis of the Pt/NbOS Electrocatalyst

The synthesis of the Pt/NbOS catalyst was performed by adding the NbOS support to 250 mL of deionized water; the mixture was left to stir for 1 h under ambient temperature. A solution of $H_2PtCl_6 \cdot xH_2O$ and deionized water was added dropwise to the NbOS solution, and stirring continued for 2 h. After 2 h, the solution was purged under $H_2$ gas for 1 h and then sealed and left to stir for 24 h. The obtained solution was filtered, washed, and dried at 80° C. in an $N_2$ atmosphere. The resulting sample was heat treated at 350° C. (heating rate of 5° C. $min^{-1}$) for 3 h under a reducing atmosphere ($H_2:N_2$ 10:90 vol %).

Physical Properties of Pt/NbOS

The electronic band gap and electrical conductivity of NbOS is reported in Table 3. The band gap value of 0.5 eV for NbOS was quite similar to that measured for TOS, and fairly close to that of TOMS. Thus, a band gap in the range of 0.3-0.6 eV may be an indicator of successful silicon doping. However, the electrical conductivity of NbOS was ca. 4 to 5-times larger than these TOS and TOMS. This may be due to the grain structure of the niobia starting material thereby allowing better particulate contact.

Figures 15A, 15B:
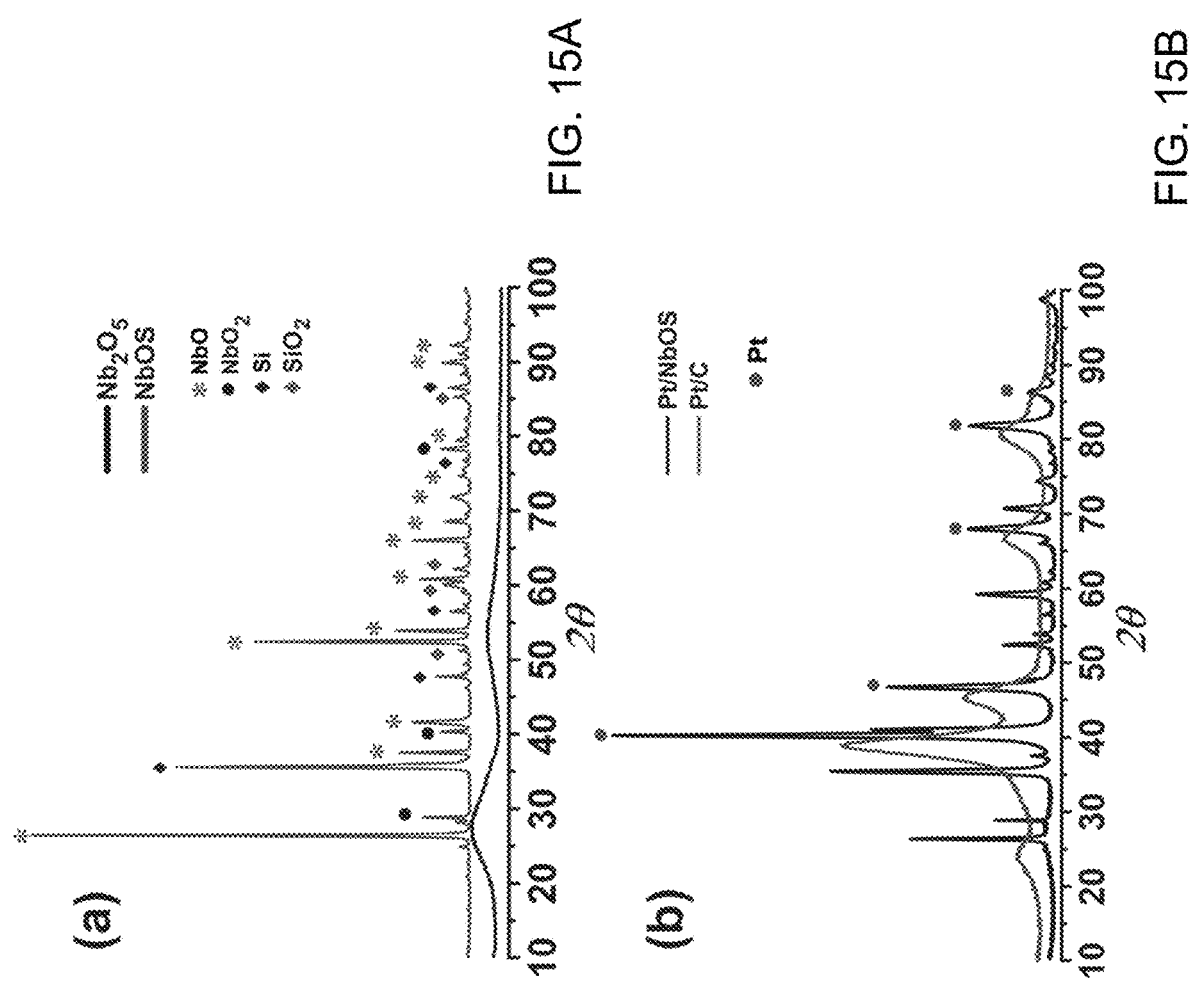
FIG. 15A shows the XRD pattern for a $Nb_2O_5$ support and a NbOS support.
FIG. 15B shows the XRD pattern for a Pt/NbOS and Pt/C electrocatalyst.

FIG. 15A shows the XRD pattern obtained from the amorphous $Nb_2O_5$ and Si doped NbOS support structure. The presence of Si favors the formation of the Niobium suboxides in a reducing environment. The corresponding diffractogram showed that the support mostly consists of NbO phases with the main characteristic reflection at 2θ=26.32° for the [110] facet. The silicon in the NbOS structure exhibited as both metallic Si (ICDD card no. 01-078-2500) and $SiO_2$ (ICDD card no. 00-046-1242). FIG. 15B shows the XRD pattern obtained for the Pt/NbOS and Pt/C electrocatalysts. Platinum exhibited in a face-centered cubic (fcc) structure (ICDD card no. 01-087-0640), with typical reflections at 2θ values of 40.0°, 46.4°, 67.9°, and 81.6° and 86.1° [23]. Compared to Pt/C, all corresponding Pt peaks of Pt/NbOS were shifted towards higher angles, indicating a decrease in the lattice spacing. This phenomenon is attributed to the SMSI between the Pt and the NbOS supports.

ORR Activity and Stability of Pt/NbOS

Figures 16A, 16B:
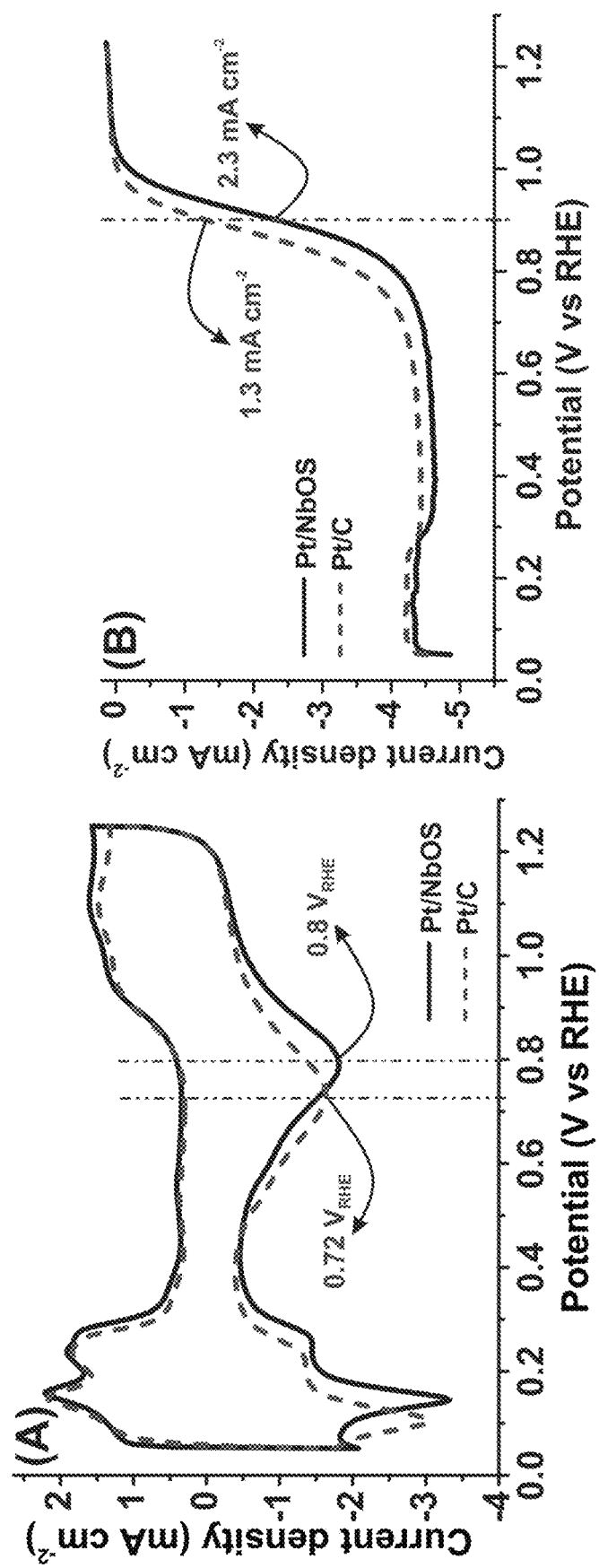
FIG. 16A shows comparisons of the CV measurements obtained for Pt/NbOS and Pt/C recorded in $N_2$-purged 0.5 M $H_2SO_4$ and a scan rate of 20 mV·s-1.
FIG. 16B shows a comparison of the ORR activity of Pt/NbOS and Pt/C recorded in O2-saturated purged 0.5 M $H_2SO_4$ at a scan rate of 5 mV·s-1 and 1200 rpm.

FIG. 16A compares the CV measurements obtained for the Pt/NbOS and the commercial Pt/C catalysts. Both electrocatalysts exhibit the classical Pt CV shape. The Pt/NbOS showed earlier reduction of adsorbed Pt oxides compared to Pt/C which arises from the SMSI effect. The ECSA of each electrocatalyst was determined by integrating the charge associated with HUPD (210 mC $cm_{Pt}^{-2}$). The Pt/NbOS catalyst exhibited a high ECSA value of 79 $m^2$ $g_{Pt}^{-1}$, which is one of the highest values reported in the literature for metal oxide supports. This confirms that catalyst particles are well dispersed onto the NbOS support. Furthermore, it also indicates that the catalyst layer created from Pt/NbOS creates a very high degree of accessibility to Pt active sites. FIG. 16B compares the ORR activity of Pt/NbOS and commercial Pt/C catalysts. The Pt/NbOS catalyst exhibited a very high onset potential of 1.03 $V_{RHE}$ for $O_2$ reduction with an $E_{1/2}$ of 0.9 $V_{RHE}$. These values are considerably higher than that measured for Pt/C and are attributed to the SMSI between Pt and TOS.

Figures 17A, 17B:
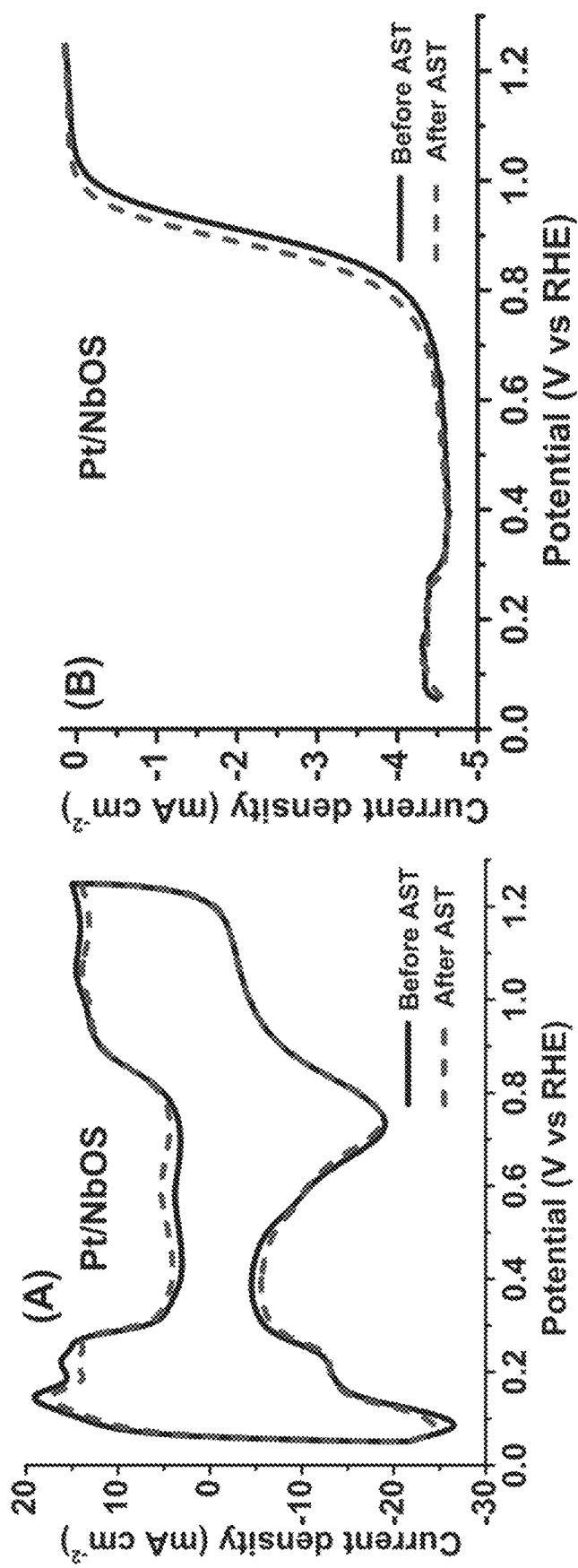
FIG. 17A shows comparisons of the CV measurements obtained for Pt/NbOS recorded in $N_2$-purged 0.1 M $H_2SO_4$ before AST-3 (BAST) and after AST-3 (AAST) (scan rate=200 mV s$^{-1}$).
FIG. 17B shows a comparison of the ORR activity of Pt/NbOS BAST and AAST (a total of 5,000 cycles were performed and data was recorded in $O_2$-saturated 0.5 M $H_2SO_4$ at a scan rate of 5 mV s$^{-1}$ and 1200 rpm).

The ex-situ stability of Pt/NbOS was according to fuel cell vehicle startup-shutdown condition, using AST-3 for 5,000 cycles. FIG. 17A compares the CV measurements obtained before and after the AST-3. Pt/NbOS shows high stability over the course of this test with no sign of surface modification/degradation on the double layer region. FIG. 17B compares the ORR activity of Pt/NbOS before and after AST-3. The Pt/NbOS electrocatalyst exhibited durability, showing only a 20 mV decay in $E_{1/2}$, considerably less than Pt/C (see FIGS. 8A-8H). The high stability and durability of Pt/NbOS referred to the SMSI effect between the Pt NPs and NbOS supports.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

[1] C. Odetola, L. Trevani, E. B. Easton, Enhanced activity and stability of Pt/TiO$_2$/carbon fuel cell electrocatalyst prepared using a glucose modifier, J. Power Sources, 294 (2015) 254-263.

[2] R. Alipour Moghadam Esfahani, A. H. A. Monteverde Videla, S. Vankova, S. Specchia, Stable and methanol tolerant Pt/TiOx-C electrocatalysts for the oxygen reduction reaction, Int. J. Hydrogen Energy, 40 (2015) 14529-14539.

[3] Z. Zhang, J. Liu, J. Gu, L. Su, L. Cheng, An overview of metal oxide materials as electrocatalysts and supports for polymer electrolyte fuel cells, Energy Environ. Sci., 7 (2014) 2535-2558.

[4] R. Alipour Moghadam Esfahani, S. K. Vankova, A. H. A. Monteverde Videla, S. Specchia, Innovative carbon-free low content Pt catalyst supported on Mo-doped titanium suboxide (Ti 3 O 5-Mo) for stable and durable oxygen reduction reaction, Appl. Catal., B, 201 (2017) 419-429.

[5] R. Alipour Moghadam Esfahani, I. I. Ebralidze, S. Specchia, E. B. Easton, A fuel cell catalyst support based on doped titanium suboxides with enhanced conductivity, durability and fuel cell performance, J. Mater. Chem. A, 6 (2018) 14805-14815.

[6] R. Alipour Moghadam Esfahani, E. B. Easton, FUEL CELL CATALYST SUPPORT BASED ON DOPED TITANIUM SUBOXIDES, U.S. patent application Ser. No. 16/592,318, 2018.

[7] R. Alipour Moghadam Esfahani, E. B. Easton, Exceptionally durable Pt/TOMS catalysts for fuel cells, Appl. Catal., B, 268 (2020) 118743.

[8] R. Alipour Moghadam Esfahani, H. M. Fruehwald, N. O. Laschuk, M. T. Sullivan, J. G. Egan, I. I. Ebralidze, O. V. Zenkina, E. B. Easton, A highly durable N-enriched titanium nanotube suboxide fuel cell catalyst support, Appl. Catal., B, 263 (2020) 118272.

[9] E. B. Easton, P. G. Pickup, An electrochemical impedance spectroscopy study of fuel cell electrodes, Electrochim. Acta, 50 (2005) 2469-2474.

[10] F. S. Saleh, E. B. Easton, Diagnosing Degradation within PEM Fuel Cell Catalyst Layers Using Electrochemical Impedance Spectroscopy, J. Electrochem. Soc., 159 (2012) B546-B553.

[11] O. O. Reid, F. S. Saleh, E. B. Easton, Application of the Transmission Line EIS Model to Fuel Cell Catalyst Layer Durability, ECS Trans., 61 (23) (2014) 25-32.

[12] Q. Shi, C. Zhu, C. Bi, H. Xia, M. H. Engelhard, D. Du, Y. Lin, Intermetallic Pd3Pb nanowire networks boost ethanol oxidation and oxygen reduction reactions with significantly improved methanol tolerance, J. Mater. Chem. A, 5 (2017) 23952-23959.

[13] H. M. Barkholtz, D. J. Liu, Advancements in rationally designed PGM-free fuel cell catalysts derived from metal-organic frameworks, Materials Horizons, 4 (2017) 20-37.

[14] L. Ge, Y. Yang, L. Wang, W. Zhou, R. De Marco, Z. Chen, J. Zou, Z. Zhu, High activity electrocatalysts from metal-organic framework-carbon nanotube templates for the oxygen reduction reaction, Carbon, 82 (2015) 417-424.

[15] O. Kartachova, A. M. Glushenkov, Y. Chen, H. Zhang, Y. Chen, Bimetallic molybdenum tungsten oxynitride: structure and electrochemical properties, J. Mater. Chem. A, 1 (2013).

[16] R. Alipour Moghadam Esfahani, R. B. Moghaddam, I. I. Ebralidze, E. B. Easton, A hydrothermal approach to access active and durable sulfonated silica-ceramic carbon electrodes for PEM fuel cell applications, Appl. Catal., B, 239 (2018) 125-132.

[17] S. E. Moosavifard, M. F. El-Kady, M. S. Rahmanifar, R. B. Kaner, M. F. Mousavi, Designing 3D highly ordered nanoporous CuO electrodes for high-performance asymmetric supercapacitors, ACS Appl Mater Interfaces, 7 (2015) 4851-4860.

[18] Q. X. Xia, J. M. Yun, R. S. Mane, L. Li, J. Fu, J. H. Lim, K. H. Kim, Enhanced electrochemical activity of perforated graphene in nickel-oxide-based supercapacitors and fabrication of potential asymmetric supercapacitors, Sustainable Energy & Fuels, 1 (2017) 529-539.

[19] E. B. Easton, H. M. Fruehwald, R. Randle, F. S. Saleh, I. I. Ebralidze, Probing the degradation of carbon black electrodes in the presence of chloride by electrochemical impedance spectroscopy, Carbon, 162 (2020) 502-509.

[20] D. G. Winter, J. W. Covington, Muir, D. M., Chloride Electrometallurgy, in: P. D. Parker (Ed.), AIME (TMS), 1982, pp. 167.

[21] A. M. Azad, S. A. Akbar, S. G. Mhaisalkar, L. D. Birkefeld, K. S. Goto, Solid-State Gas Sensors—a Review, J. Electrochem. Soc., 139 (1992) 3690-3704.

[22] S. Morin, H. Dumont, B. E. Conway, Evaluation of the effect of two-dimensional geometry of Pt single-crystal faces on the kinetics of upd of H using impedance spectroscopy, J. Electroanal. Chem., 412 (1996) 39-52.

[23] G. E. Beghi, A decade of research on thermochemical hydrogen at the Joint Research Centre, Ispra, Int. J. Hydrogen Energy, 11 (1986) 761-771.

What is claimed is:

1. An oxygen reduction electrocatalyst comprising:
a suboxide core comprising an oxygen deficient metal oxide and a dopant; and
an outer shell covering the suboxide core, the outer shell comprising the dopant in oxide form;
the dopant of the suboxide core provides for the suboxide core to be conductive;
the suboxide core comprises one of $TiO_2$, $Nb_2O_5$ and $Ta_2O_5$ and the dopant comprises copper (Cu) and nickel (Ni);
the electrocatalyst has a band gap in a range of 0.3 eV to 0.5 eV; and
in an absence of a platinum group metal or a platinum group metal alloy catalyst, the electrocatalyst has a half wave potential of at least 0.6 V versus a reversible hydrogen electrode in a rotating disk electrode experiment (RHE).

2. The electrocatalyst of claim 1, in an absence of a platinum group metal or a platinum group metal alloy catalyst, the electrocatalyst has an onset potential of at least 0.7 V RHE.

3. An electrocatalyst for an electrochemical cell, the electrocatalyst comprising:
the oxygen reduction electrocatalyst of claim 1;
a platinum group metal or a platinum group metal alloy catalyst.

4. The oxygen reduction electrocatalyst of claim 1, wherein the suboxide core comprises $Nb_2O_5$.

5. The oxygen reduction electrocatalyst support structure of claim 1, wherein the suboxide core comprises $Ta_2O_5$.

6. The oxygen reduction electrocatalyst of claim 1, wherein the suboxide core comprises $TiO_2$.

\* \* \* \* \*